United States Patent [19]
Toki

[11] Patent Number: 5,895,462
[45] Date of Patent: Apr. 20, 1999

[54] INFORMATION SERVICE TERMINAL FOR ACCESSING INFORMATION FROM A NETWORK BASED ON USER CHANNEL SELECTIONS

[75] Inventor: Yasuyuki Toki, Tokyo, Japan

[73] Assignee: NEC Corporation, Tokyo, Japan

[21] Appl. No.: 08/799,884

[22] Filed: Feb. 13, 1997

[30] Foreign Application Priority Data

Feb. 16, 1996 [JP] Japan .................................. 8-029035

[51] Int. Cl.[6] .................................................. G06F 15/173
[52] U.S. Cl. ............................. 707/3; 707/10; 707/104; 395/200.31; 395/200.59; 379/93.24; 379/93.25; 379/102.03
[58] Field of Search ................................. 707/3, 10, 104; 395/200.31, 200.59, 93.24, 93.25, 102.03

[56] References Cited

U.S. PATENT DOCUMENTS

| | | | |
|---|---|---|---|
| 5,461,667 | 10/1995 | Remillard | 379/93.24 |
| 5,512,935 | 4/1996 | Majeti et al. | 348/9 |
| 5,717,860 | 2/1998 | Graber et al. | 395/200.12 |
| 5,721,908 | 2/1998 | Lagarde et al. | 707/10 |

FOREIGN PATENT DOCUMENTS

| | | |
|---|---|---|
| 59-11336 | 1/1984 | Japan . |
| 62-53085 | 3/1987 | Japan . |
| 63-283380 | 11/1988 | Japan . |
| 6-348625 | 12/1994 | Japan . |
| 7-78111 | 3/1995 | Japan . |

OTHER PUBLICATIONS

Metcalfe, B., "Couch potatoes armed with Viewcall can surf the Web through the tube", Infoworld, p. 50, Dec. 18, 1995.

Sweeney, J., "An Introduction to Interactive Television", IEE, pp. 503–508; International Broadcasting Convention, Sep. 16–20 1994, Conference Publication No. 397.

Dejesus, E., "How the intenet will replace broadcasting", Byte, pp. 51–54, Feb. 1996.

Nikkei Personal Computing, No. 256, Jan. 15, 1996, pp. 150–175.

Japanese Patent Office Office Action, Oct. 27, 1998 and English Traslation of same.

Primary Examiner—Paul R. Lintz
Assistant Examiner—Jean R. Homere
Attorney, Agent, or Firm—Whitham, Curtis & Whitham

[57] ABSTRACT

An information service terminal which allows the user to access various items such as the Web pages on the Internet without operating a keyboard and a mouse through complex sequences. The information service terminal has an address database for storing URLs (Uniform Resource Locators), which are used as addresses of the Web pages, in association with respective channels, a channel remote-controller for inputting a channel number, and a display unit. In the terminal, when one of the channel is selected, depending on the channel number, the address database is searched for a corresponding one of the URLs to access the corresponding Web page. The user can browse the desired Web page data by designating the corresponding channel number by the channel remote-controller.

18 Claims, 29 Drawing Sheets

```
┌─────────────────┐
│ GO FXYZOS       │──520
└─────────────────┘

┌──────────────────────────────────────────────────────────────┐
│ < XYZOS forum > FXYZOS                                       │
│ 1 : Announcement    * : Bulletin board   3 : Electronic conference │──521
│ 4 : Data library    * : Member info.     6 : Realtime conferencing │
│ 7 : Mail for SYSOP      8 : Option       E : End             │
└──────────────────────────────────────────────────────────────┘

┌─────────────────┐
│ 3               │──522
└─────────────────┘
```

| No. | Speech (not read) | Last Update | Names of conference rooms |
|---|---|---|---|
| 1 | 20 ( 20) | 01/29 | [GUIDE] Guide from FXYZOS forum |
| 2 | 852 ( 852) | 01/29 | [NEW ARRIVAL] XYZOS online software |
| 3 | 517 ( 196) | 01/29 | [Opinion] Online software [application] |
| 4 | 819 ( 361) | 01/29 | [Opinion] Online software [file] |
| 5 | 626 ( 205) | 01/25 | [Opinion] Online software [accessory] |
| 6 | 6 ( 6) | 11/30 | [Opinion] Online software [game] |
| 7 | 596 ( 73) | 01/29 | [Opinion] Online software [communication] |
| 8 | 4 ( 2) | 01/21 | [Opinion] Online software [screen saver] |

──523

```
┌─────────────────┐
│ 3               │──524
└─────────────────┘

┌──────────────────────────────────────────────────────────────┐
│ Electronic conference (1 : Speech, CR only : read) parent mode │──525
└──────────────────────────────────────────────────────────────┘

┌─────────────────┐
│ (CR)            │──526
└─────────────────┘

┌──────────────────────────────────────────────────────────────┐
│ XYZ editor fault                                             │
│                                                              │
│ Characters on screen are disturbed in a row number display mode │
│ when used on XYZOS. They are normal is no row number is      │──527
│ displayed.                                                   │
│                                                              │
│ You can receive the latest version by contacting XYZ corporation. │
└──────────────────────────────────────────────────────────────┘
```

FIG. 2 (PRIOR ART)

| KEY NAME | KEY CODE |
|---|---|
| NUMERIC KEY "0" | 0 |
| NUMERIC KEY "1" | 1 |
| NUMERIC KEY "2" | 2 |
| NUMERIC KEY "3" | 3 |
| NUMERIC KEY "4" | 4 |
| NUMERIC KEY "5" | 5 |
| NUMERIC KEY "6" | 6 |
| NUMERIC KEY "7" | 7 |
| NUMERIC KEY "8" | 8 |
| NUMERIC KEY "9" | 9 |
| ALPHABET SELECTION KEY (SEL 1) | 10 |
| ALPHABET SELECTION KEY (SEL 2) | 11 |
| ALPHABET SELECTION KEY (SEL 3) | 12 |
| CARRIAGE RETURN (CR) KEY | 13 |
| REGISTRATION KEY | 20 |
| UP ARROW KEY | 30 |
| DOWN ARROW KEY | 31 |

FIG. 6

| |
|---|
| REGISTRATION FLAG (Flag) |
| CHANNEL VARIABLE (CH) |
| URL BUFFER |
| BUFFER POINTER (PTR) |
| ALPHABET SHIFT FLAG (SFT) |
| KEY CODE MEMORY (KEY) |
| CHARACTER CODE BUFFER (CHR) |

FIG. 7

| | COMMUNICATION SERVICE NAME FIELD 180 | TELEPHONE NUMBER FIELD 181 | LOGIN NAME FIELD 182 | PASSWORD FIELD 183 |
|---|---|---|---|---|
| RECORD #0 → | AAA-NET | 03-1234-5678 | ABC12345 | PASSWORD |
| RECORD #1 → | ZZZ-NET | 03-2345-6789 | XYZ99999 | PASS1 |
| | ⋮ | ⋮ | ⋮ | ⋮ |
| RECORD #8 → | | (EMPTY) | | |
| RECORD #9 → | | (EMPTY) | | |

| | IDENTIFIER FIELD 190 | COMMAND CHARACTER STRING FIELD 191 |
|---|---|---|
| RECORD #0 → | 1 | GO FXYZOS(CR) 3 (CR) 3 (CR)(CR) |
| RECORD #1 → | 0 | |
| RECORD #2 → | 1 | |
| | | |
| RECORD #99 → | (EMPTY) | |

| REGISTRATION FLAG (Flag) |
| CHANNEL VARIABLE (CH) |
| BUFFER POINTER (PTR) |
| ALPHABET SHIFT FLAG (SFT) |
| KEY CODE MEMORY (KEY) |
| CHARACTER CODE BUFFER (CHR) |
| LOGIN VARIABLE (LOGIN) |
| IDENTIFIER BUFFER (ID) |
| COMMUNICATION SERVICE NAME BUFFER |
| TELEPHONE NUMBER BUFFER |
| LOGIN NAME BUFFER |
| PASSWORD BUFFER |
| COMMAND CHARACTER STRING BUFFER |

INFORMATION SERVICE TERMINAL FOR ACCESSING INFORMATION FROM A NETWORK BASED ON USER CHANNEL SELECTIONS

BACKGROUND OF THE INVENTION

1. Field of the Invention

The present invention relates to an information service terminal for receiving information from a computer network such as the Internet, and more particularly to an information service terminal capable of selecting one, at a time, of a plurality of information services and displaying information from the selected information service.

2. Description of the Prior Art

With rapid advances in the computer network technology, it is now possible for network users to acquire a wide variety of information as desired from computer networks. One form of information acquisition from computer networks is the WWW (World Wide Web) service available on the Internet. On the Internet, there are addresses known as URLs (Uniform Resource Locators) assigned respectively to information documents referred to as Web pages. When the user inputs the URL assigned to a desired Web page on the Internet, the user can access the Web page through the WWW service. Access software used by Internet terminals for enabling the users to access and display Web pages is generally called a WWW browser.

FIG. 1 of the accompanying drawings shows a process of operation of a conventional WWW browser for inputting a URL and accessing a corresponding Web page. It is assumed that an Internet terminal used by the user is connected to the Internet when it is connected to an Internet provider through a modem apparatus. Typically, the Internet terminal comprises a personal computer in which the application software of the WWW browser is installed.

First, the user inputs the URL of a Web page which the user wants to read through a keyboard. The WWW browser determines whether the URL is inputted through the keyboard or not in step 501. If the URL is inputted through the keyboard, then the WWW browser acquires the inputted URL from the keyboard in step 502 and then transmits the URL through the modem to the Internet in step 503. In step 504, the WWW browser receives a Web page data indicated by the URL from the Internet in step 504. Thereafter, the WWW browser displays information of the latest received Web page data on the display unit in step 505, and then returns to step 501.

The user may designate a URL through a process other than the process using the keyboard. For example, the user may register, in advance, a list of URLs on an address book, and then use a pointing device such as a mouse on the address book displayed on the screen to indicate a desired URL from the address book. When the user uses the address book, the user uses a mouse or the like to select an address book command and then selects a desired URL from the address book with the mouse or the like. Since the list of URLs is usually too large to be displayed within a full-screen image, the user needs to scroll the displayed address book until a desired URL is displayed for selection.

A process of using the address book to select a desired URL is as follows: If no URL is inputted through the keyboard in step 501, the WWW browser determines whether there is an input from the mouse or not in step 506. If there is no input from the mouse, then the WWW browser returns to step 501. If there is an input from the mouse, then

2 the WWW browser determines whether the input from the mouse is an address book command or not in step 507. If the input from the mouse is not an address book command, then the WWW browser goes to step 509 and processes in step 509 another command as the input from the mouse, after which the WWW browser returns to step 501. If the input from the mouse is an address book command, then the WWW browser reads a URL which the user has selected with the mouse in step 508, and jumps to step 503.

General information services other than the WWW service on the Internet include center-to-end type personal computer communication services or BBSs (Bulletin Board Services). Generally, information items available through the personal computer communication can be called in by following a hierarchical menu tree. Conventional communication software for personal computer communication terminals transmits characters inputted from keyboards simply through modems to the center of personal computer communication services. FIG. 2 of the accompanying drawings shows an example of the structure of a service tree of personal computer communication services.

If the user wants to call an electronic conference service relative to,t for example, "XYZOS" which is a typical OS (Operating System), the user inputs a command "GO FXYZOS" to call a XYZOS forum as indicated by a character string 520 in FIG. 2. The center of personal computer communication services then transmits data of a submenu in a layer to the user's personal computer terminal. The user's personal computer terminal displays on its display unit the transmitted submenu as indicated by a character string 521. The user selects the electronic conference service from the submenu by inputting a selection number "3" for the electronic conference service through the keyboard as indicated by a character string 522. The center of personal computer communication services transmits data of a submenu in a layer which is below the submenu indicated by the character string 521. The user's personal computer terminal displays on its display unit the transmitted submenu as indicated by a character string 523. If the user selects "'Opinion' Online Software Information Forum 'Application'" from the submenu, then the user inputs its selection number "3" through the keyboard as indicated by a character string 524. The center of personal computer communication services further transmits data of a submenu in a layer which is below the submenu indicated by the character string 523. The user's personal computer terminal displays on its display unit the transmitted submenu as indicated by a character string 525. If the user selects "Read" from the submenu, then the user presses the carriage return key on the keyboard as indicated by a character string 526. The characters "CR" of the character string represent "Carriage Return". Now, the service which allows the user to read the conference minutes called in, and the user's personal computer terminal displays on its display unit appropriate information as indicated by a character string 527.

Some software for personal computer communication includes macro functions to register a plurality of command character strings as a macro. When the user calls a certain service or item using such a macro function, the user selects a macro execution command with the mouse or the like, and then selects the macro of the desired service from a displayed list of macros.

On the Internet, a vast number of Web pages are currently available and frequently updated. The user needs to frequently read pages of Web sites of interest in order to determine whether they are updated or not. According to the present browsing technology, if the user wants to successively read 1000 Web-pages, for example, everyday to look for those Web pages which have been updated and contain additional interesting information, then the user is presently required to either input corresponding 1000 URLs through the key-board or repeat 1000 times a process of selecting an address book command with the mouse or the like and selecting a URL from the address book. Therefore, insofar as the user relies upon the present browsing technology, it is time-consuming and impractical for the user to repeatedly browse a number of Web pages everyday.

In the personal computer communication services or the BBSs, information is also frequently added to and updated in the menus. If the user wants to successively read 1000 menus, for example, everyday to look for those items of information which have been updated and contain additional interesting information, then the user is presently required to either input command strings for calling the respective 1000 menus through the keyboard or repeat 1000 times a process of selecting a macro execution command with the mouse or the like and selecting the macro of a desired menu from a list of macros. Such repeated sequences are also time-consuming and impractical.

When the user uses information services in a plurality of categories, e.g., the Internet and the personal computer communication service, the user needs to have as many different access software programs as the number of the information services. Since it is necessary for the user to select and execute those access software programs as well as the above browsing sequences for the respective information services, the overall operation is further complex and time-consuming.

SUMMARY OF THE INVENTION

It is an object of the present invention to provide an information service terminal which allows the user to access various items of information in information services without operating a keyboard and a mouse through complex sequences.

According to the present invention, the above object can be achieved by an information service terminal comprising address database means for storing addresses or paths assigned to respective items of information available from an information service, in association with respective channels, input means for inputting a channel number, selecting means for selecting one of the channels, depending on the channel number, to search the address database means for a corresponding one of the addresses or paths stored therein to acquire a corresponding item of information from the information service, and display means for displaying the acquired item of information.

The above and other objects, features, and advantages of the present invention will become apparent from the following description with references to the accompanying drawings which illustrate examples of the present invention.

BRIEF DESCRIPTION OF THE DRAWINGS

FIG. 2 is a diagram of the structure of a service menu system in personal computer communication services;

FIG. 6 is a diagram showing, by way of example, key codes outputted by the channel remote-controller of the information service terminal according to the first embodiment;

FIG. 7 is a diagram showing the structure of control information in the information service terminal according to the first embodiment;

FIG. 14 is a diagram showing the structure of a communication service database in an information service terminal according to a second embodiment of the present invention;

FIG. 15 is a diagram showing the structure of an address database in the information service terminal according to the second embodiment;

FIG. 16 is a diagram showing the structure of control information in the information service terminal according to the second embodiment;

DESCRIPTION OF THE PREFERRED EMBODIMENTS

First Embodiment

Figure 1:
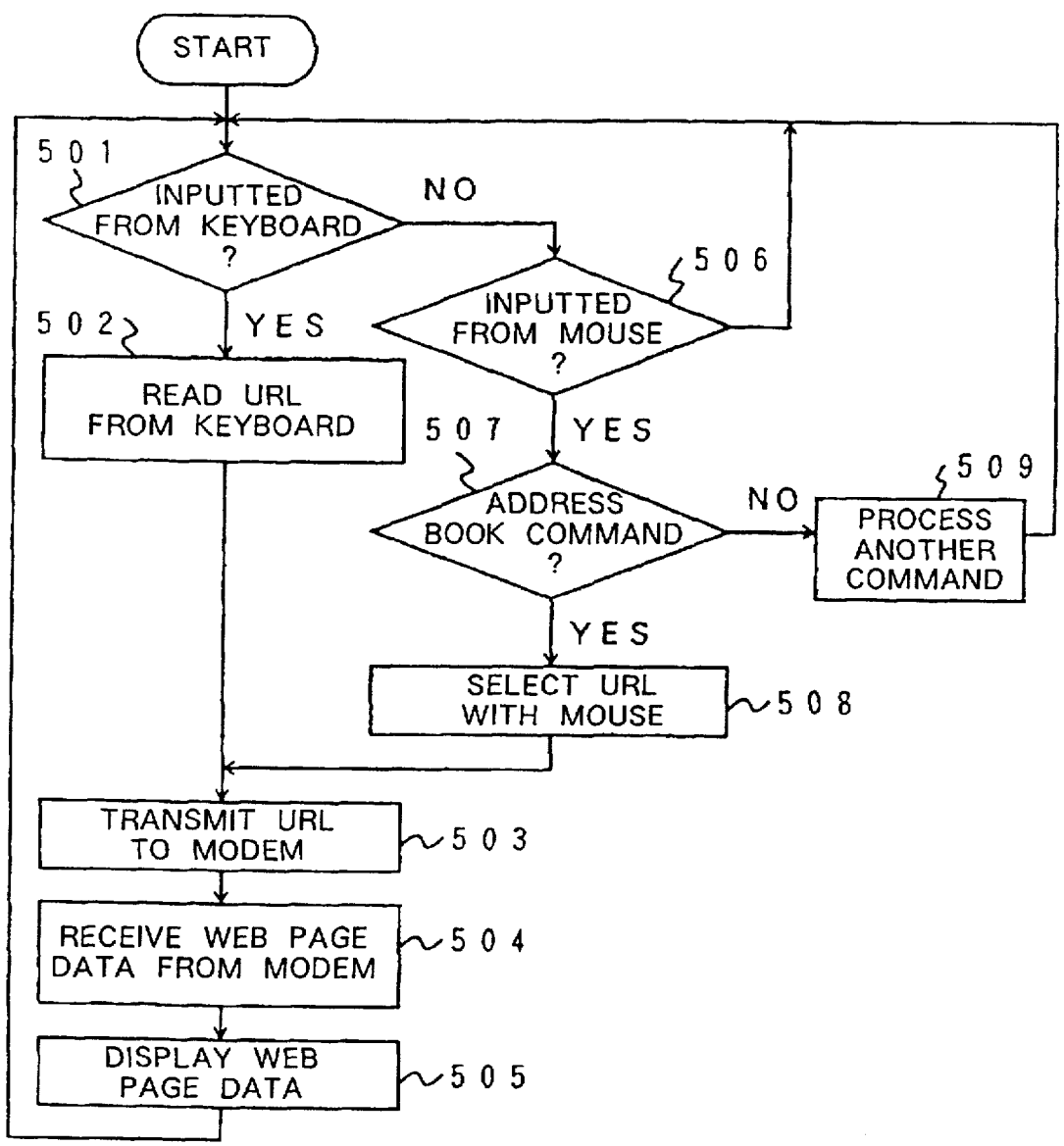
FIG. 1 is a flowchart of an operation sequence of a conventional WWW browser.
Figure 3:
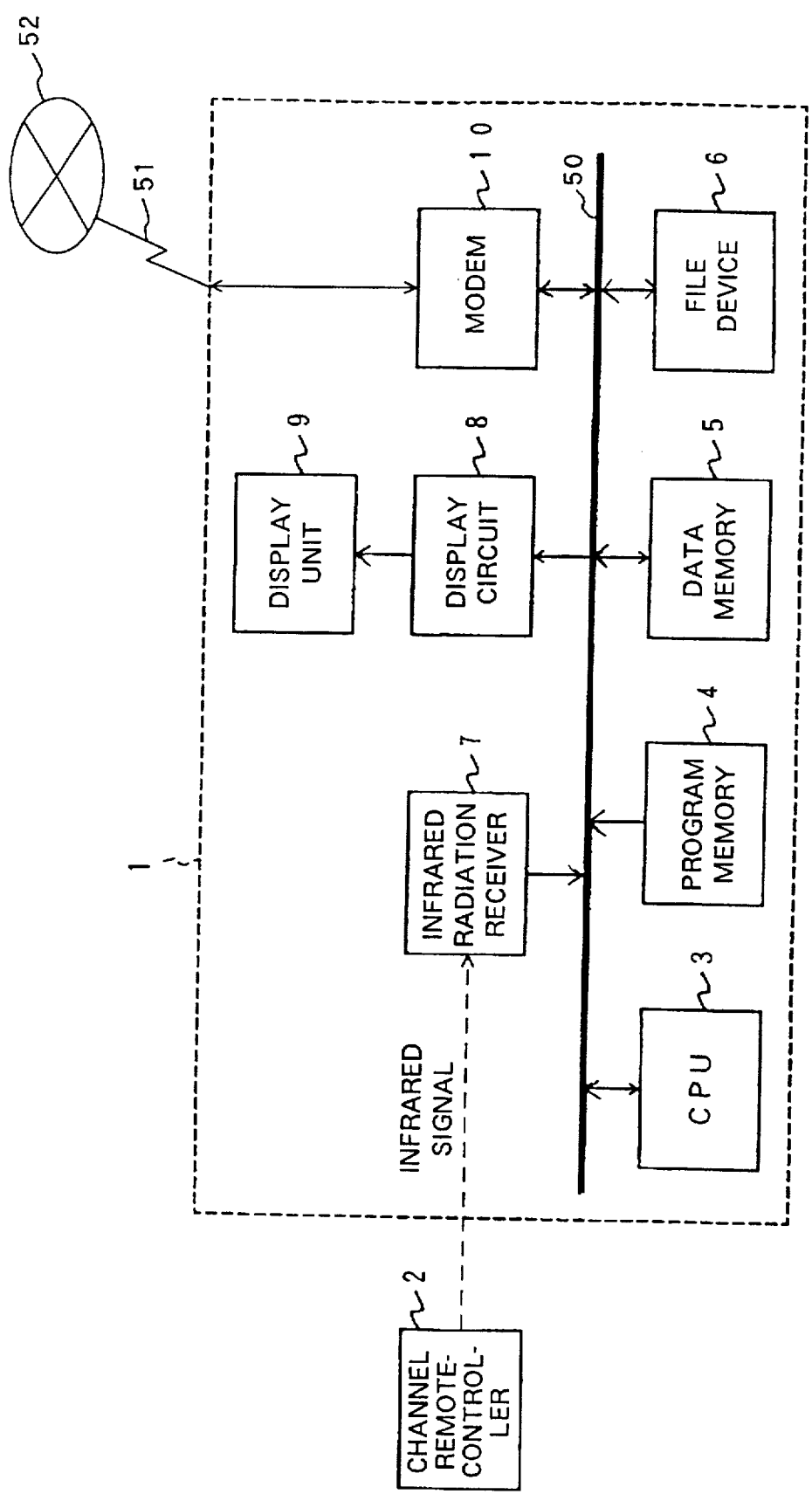
FIG. 3 is a block diagram of an information service terminal according to a first embodiment of the present invention.

As shown in FIG. 3, an information service terminal according to a first embodiment of the present invention generally comprises an information service terminal unit 1 and a channel remote-controller 2. The channel remote-controller 2 is of a structure similar to a conventional wireless channel remote-controller for use with home television sets, and transmits control commands by way of infrared (IR) radiation to the information service terminal unit 1.

The information service terminal unit 1 comprises a CPU (Central Processing Unit) 3, a program memory 4 which stores a control program, a data memory 5 for storing control information, a file device 6 for storing an address database A, an infrared radiation receiver for receiving control commands from the channel remote-controller 2, a display circuit 8, a display unit 9 such as a CRT (Cathode-Ray Tube), LCD (Liquid Crystal Display) or the like drivable by the display circuit 8, and a modem 10. The CPU 3, the program memory 4, the data memory 5, the file device 6, the infrared radiation receiver 7, the display circuit 8, and the modem 10 are commonly connected to a bus 50. When the modem 10 is connected to an Internet provider through an analog telephone line 51, the information service terminal unit 1 is connected to the Internet 52. If the information service terminal unit 1 is to be connected to the Internet 52 through an ISDN (Integrated Service Digital Network), then a TA (Terminal Adapter) is used in place of the modem 10.

Figure 4:
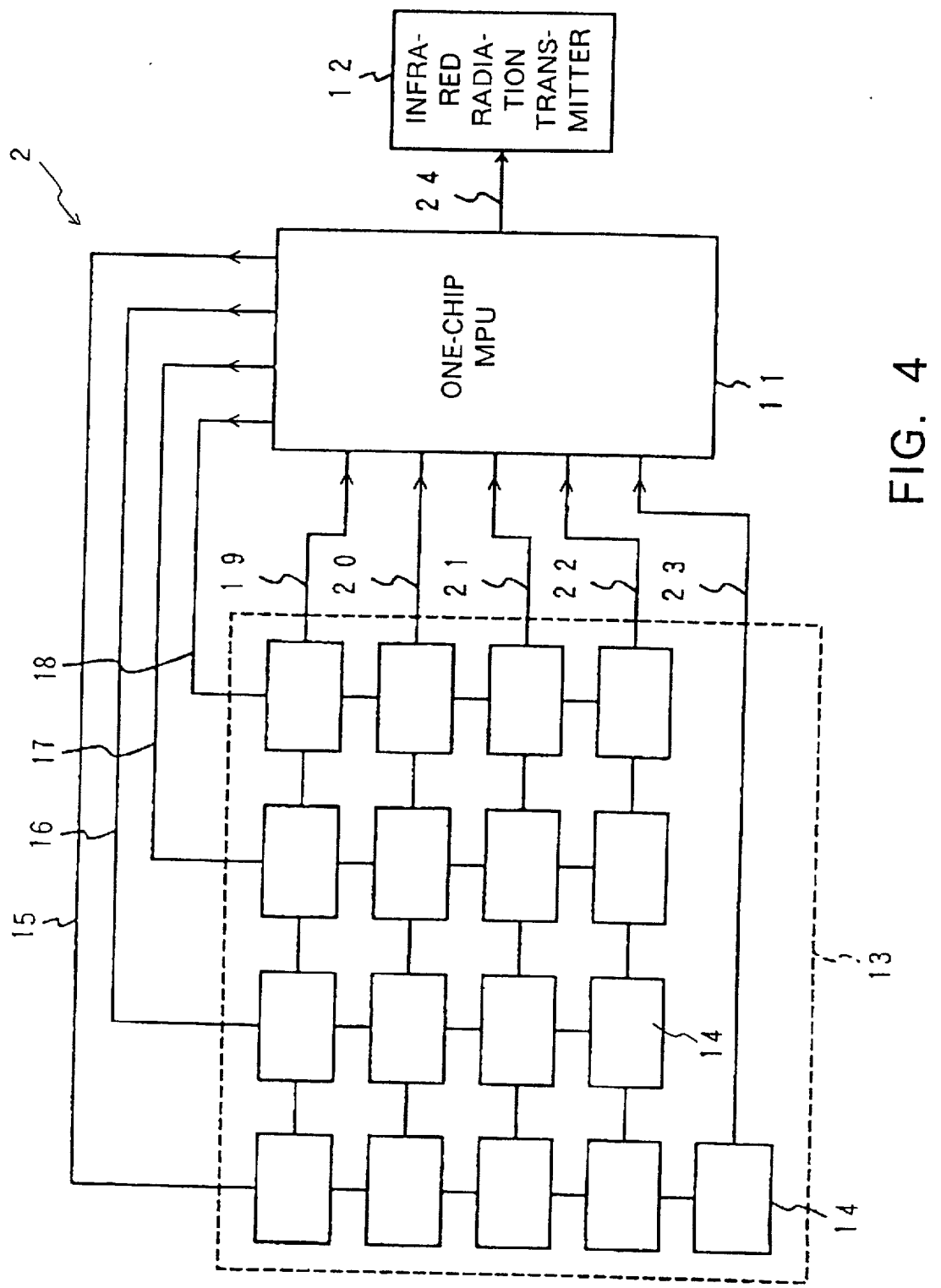
FIG. 4 is a block diagram of a channel remote-controller of the information service terminal according to the first embodiment.

As shown in FIG. 4, the channel remote-controller 2 comprises a one-chip MPU (MicroProcessor Unit) 11, an infrared radiation transmitter 12 for transmitting control commands by way of infrared radiation to the information service terminal unit 1, and a keyboard matrix 13. The keyboard matrix 13 has seventeen (17) keys 14, for example, which are connected in a matrix to four output ports 15–18 and five input ports 19–23 of the one-chip MPU 11.

Figure 5:
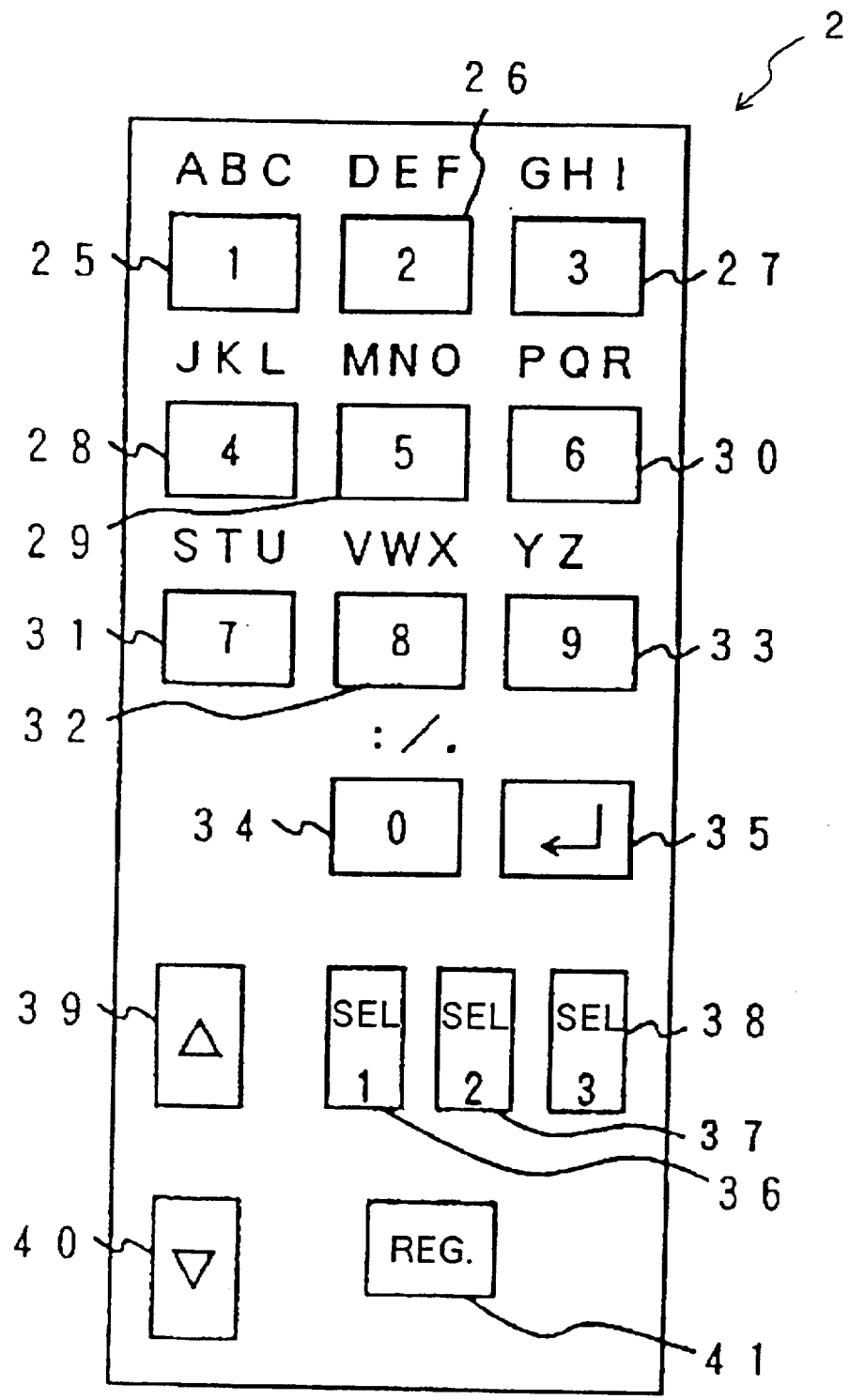
FIG. 5 is a plan view of the channel remote-controller of the information service terminal according to the first embodiment.

The appearance of the channel remote-controller 2 and the layout of the keys 14 are shown in FIG. 5. As shown in FIG. 5, the seventeen keys 14 of the keyboard matrix 13 include ten (10) numeric keys 25–34 representing respective numbers "0" through "9", a carriage return key 35 for inputting a carriage return character, three alphabet selection keys 36–38, up and down arrow keys 39, 40, and a registration key 41.

As shown in FIG. 6, key codes are assigned to these keys, respectively, according to a conversion rule. The one-chip MPU 11 scans the keyboard matrix 13 through the output ports 15–18 and the input ports 19–23, detects a key which is pressed by the user, converts the pressed key into a key code according to the conversion rule shown in FIG. 6, and outputs the key code from the output port 24 to the infrared radiation transmitter 12. The infrared radiation transmitter 12 converts the supplied key code into an infrared signal, and transmits the infrared signal as a control command to the information service terminal unit 1. The above operation of the channel remote-controller 2 is the same as the conventional wireless channel remote-controller for use with home television sets.

In the information service terminal unit 1, the infrared radiation receiver 7 receives the control command transmitted from the infrared radiation transmitter 12 of the channel remote-controller 2, and transfers the received control command to the CPU 3. The modem 10 converts digital data supplied from the CPU 3 into an analog signal and transmits the analog signal to the analog telephone line 51, and also converts an analog signal received from the analog telephone line 51 into digital data and transmits the digital data to the CPU 3. The display circuit 8 comprises a VGA (Video Graphics Array) display circuit used in general personal computers, and outputs display data supplied from the CPU 3 on the display unit 9.

Figure 8:
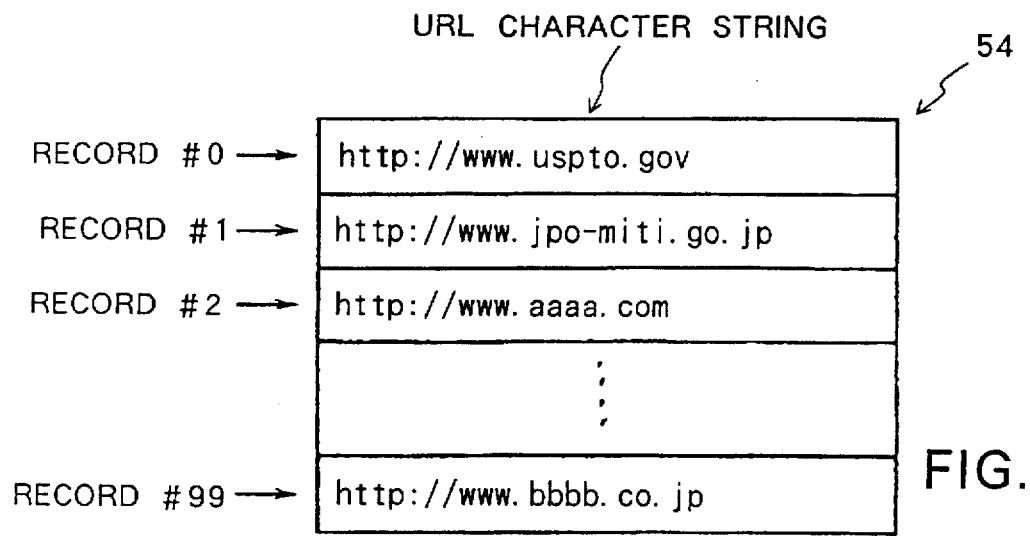
FIG. 8 is a diagram showing the structure of an address database in the information service terminal according to the first embodiment.

The data memory 5 stores control information 53 shown in FIG. 7. The control information 53 includes a registration flag (Flag), a channel variable (CH), a URL buffer, a buffer pointer (PTR), an alphabet shift flag (SFT), a key code memory (KEY), and a character code buffer (CHR). The file device 6 stores an address database A 54 shown in FIG. 8. As shown in FIG. 8, the address database A 54 comprises 100 records #0–#99 each storing one URL character string.

Operation of the information service terminal according to the first embodiment will be described below. The information service terminal is controlled by a control program shown in FIG. 9. One hundred (100) channels ch-0–ch-99 are defined in the information service terminal, and URLs of Web pages are registered respectively in the 100 channels ch-0–ch-99. When one of the channels is selected by the user using the channel remote-controller 2, the Web page of the URL which is registered in the selected channel is read from the Internet 52 and displayed on the display unit 9.

Figure 9:
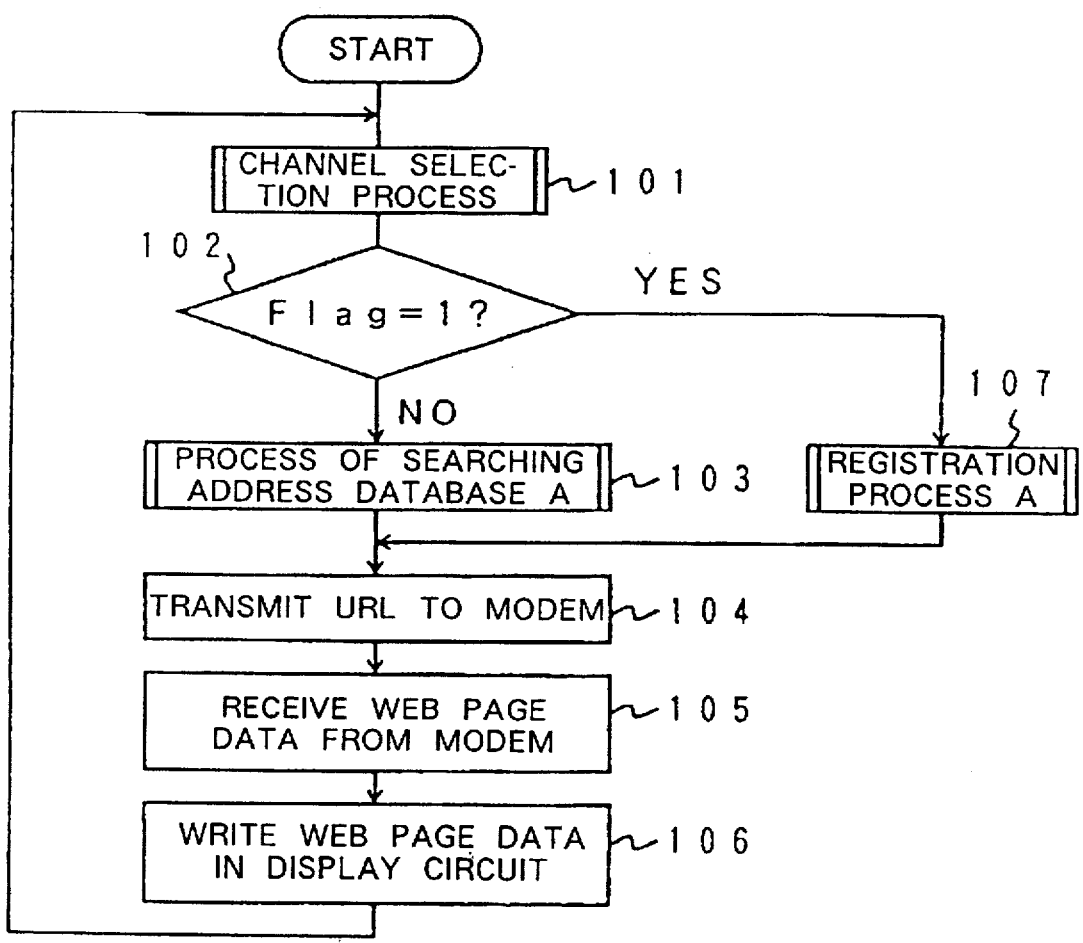
FIG. 9 is a flowchart of an operation sequence of a control program in the information service terminal according to the first embodiment.

The CPU 3 calls a channel selection process in step 101 shown in FIG. 9. The channel selection process will be described in detail later on. If a key pressed by the user on the channel remote-controller 2 is the registration key 41, then the channel selection process sets the registration flag (Flag) to "1". If a key pressed by the user on the channel remote-controller 2 is not the registration key 41, then the channel selection process converts the key code of the pressed key into a channel number, stores the channel number in the channel variable (CH), and clears the registration flag (Flag) to "0". Then, the CPU 3 checks the value of the registration flag (Flag) in step 102. If the registration flag (Flag)=1, then the CPU 3 calls a registration process A in step 107, and then control goes to step 104. If the registration flag (Flag)=0 in step 102, then the CPU 3 calls a process of searching the address database A 54 in step 103, and then control goes to step 104. As described later on, the process of searching the address database A 54 is a process of returning a URL character string registered in the channel indicated by the channel variable (CH) to the URL buffer.

In step 104, the CPU 3 outputs the URL character string stored in the URL buffer to the modem 10. The URL character string is transmitted to the Internet 52 based on a predetermined protocol, and then, data of the Web page represented by the URL character string is transmitted from a corresponding site on the Internet 52. The CPU 3 receives the Web page data through the modem 10 in step 105, and writes the received data in the display circuit 8 in step 106. Thereafter, control goes back to step 101. The received Web page data are now displayed on the display unit 9. Steps 104–106 are the same as a process of displaying Web data according to the conventional WWW browser.

Figure 10:
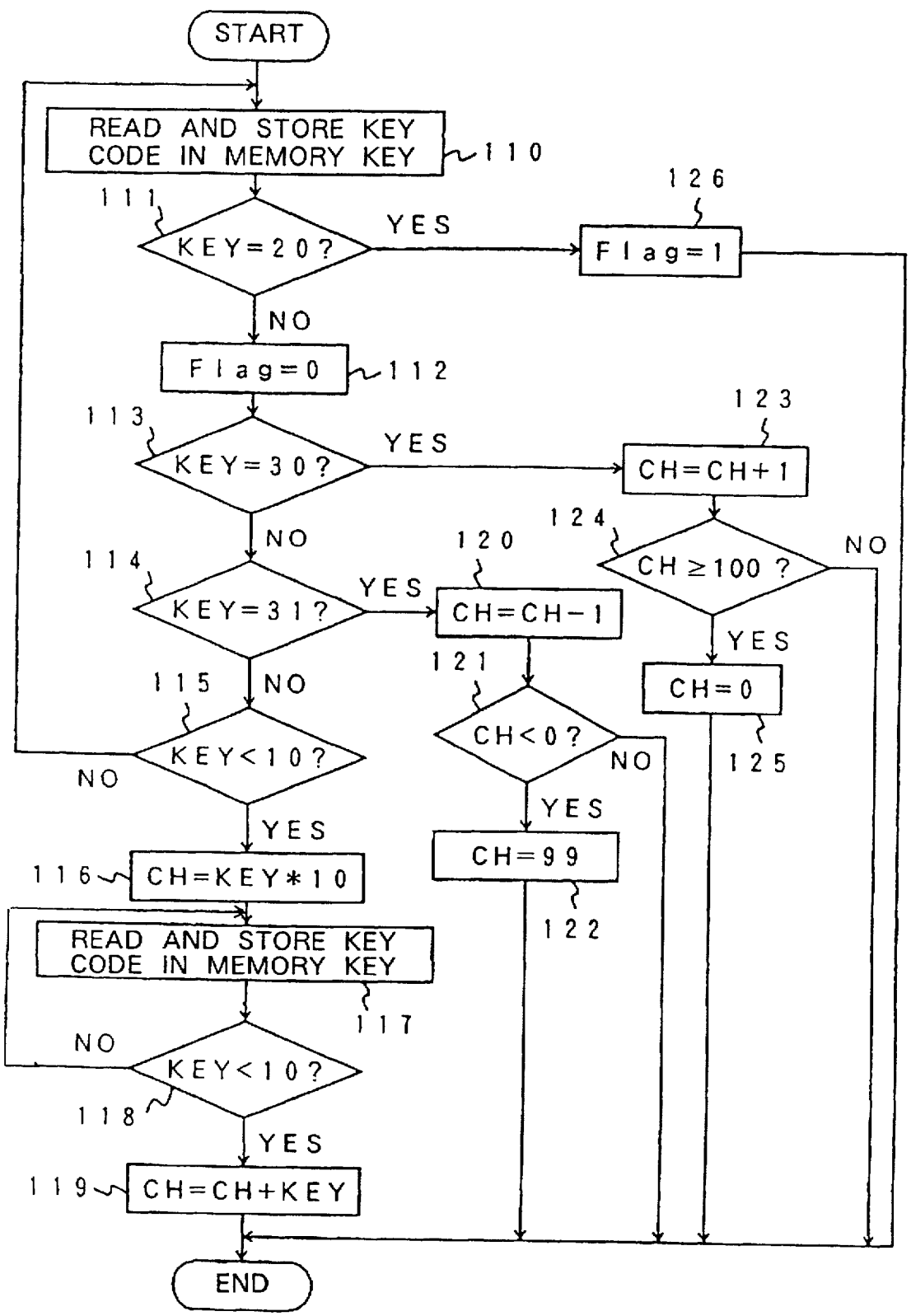
FIG. 10 is a flowchart of an operation sequence of a channel selecting process in the information service terminal according to the first embodiment.

The channel selection process in step 101 shown in FIG. 9 will be described below. The channel selection process is executed according to a flowchart shown in FIG. 10. When the user presses a key on the channel remote-controller 2, the key code corresponding to the pressed key is received by the infrared radiation receiver 7 of the information service terminal unit 1, and stored in a key code memory KEY in step 110. Then, the CPU 3 determines in step 111 whether the key code stored in the key code memory KEY is "20", (KEY=20) or not. If KEY=20, i.e., if the pressed key is the registration key 41, then the CPU 3 sets the registration flag (Flag) to "1" in step 126, and finishes the channel selection process. If KEY≠20, then theCPU 3 resets the registration flag (Flag) to "0" in step 112, and determines in step 113 whether the key code stored in the key code memory KEY is "30" (KEY=30) or not, i.e., whether the pressed key is the up arrow key 39 or not. If the pressed key is the up arrow key 39, then the CPU 3 adds "1" to the channel variable (CH) in step 123 in order to select a channel following the present channel. In order to confirm whether the channel variable (CH) falls in a range from "0" to "99", the CPU 3 determines in step 124 whether variable (CH) is equal to or greater than "100", (CH≧100) or not. If CH<100, then the CPU 3 brings an end to the channel selection process. If CH≧100, then the CPU 3 resets the channel variable (CH) to "0" in step 125 and then brings an end to the channel selection process.

If KEY≠30, then the CPU 3 determines in step 114 whether the key code stored in the key code memory KEY is "31" (KEY=31) or not, i.e., whether the pressed key is the down arrow key 40 or not. If the down arrow key 40 is pressed, then the CPU 3 subtracts "1" from the channel variable (CH) in step 120 in order to select a channel preceding the present channel. In order to confirm whether the channel variable (CH) falls in a range from "0" to "99", the CPU 3 determines in step 121 whether variable (CH) is smaller than "0" (CH<0) or not. If CH≧0, then the CPU 3 brings an end to the channel selection process. If CH<0, then the CPU 3 sets the channel variable (CH) to "99" in step 122 and then brings an end to the channel selection process.

If KEY≠31 in step 114, then the CPU 3 determines in step 115 whether the key code stored in the key code memory KEY is smaller than "10" (KEY<10) or not, i.e., whether the pressed key is either one of the ten numeric keys 25–34 or not. If KEY≧10, then control returns to step 110 in order to process a next key code. If KEY<10, then the CPU 3 stores (KEY*10) in the channel variable (CH) in step 116 in order to put the inputted numeral into the high-order place of a two-figure channel number. Then, the CPU 3 stores a key code which is inputted next in the key code memory KEY in step 117. Thereafter, the CPU 3 determines in step 118 whether the key code stored in the key code memory KEY is smaller than "10" (KEY<10) or not. If KEY≧10, i.e., if the pressed key is a key other than the numeric keys, then the control returns to step 117. If KEY<10, i.e., if one of the numeric keys 25–34 is pressed, then the CPU 3 stores "CH+KEY" in the channel variable (CH) in step 119 in order to put the inputted numeral into the low-order place of a two-figure channel number. Then, the CPU 3 brings an end to the channel selection process.

Figure 11:
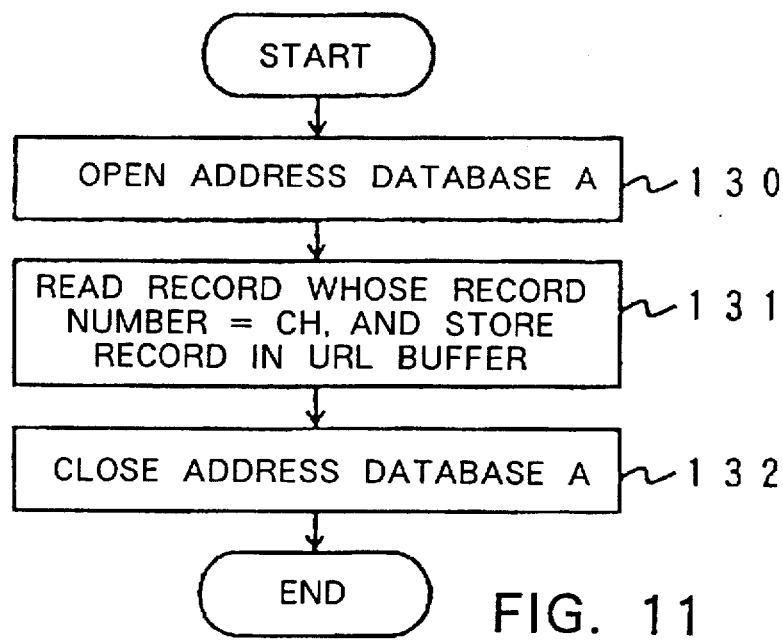
FIG. 11 is a flowchart of an operation sequence of a process of searching the address database in the information service terminal according to the first embodiment.

The process of searching the address database A 54 in step 103 shown in FIG. 9 will be described below with reference to a flowchart shown in FIG. 11.

As shown in FIG. 8, the address database A 54 comprises 100 records #0–#99 corresponding to respective 100 channels ch-0–ch-99, each of the records storing a URL character string. The record #0 corresponds to the channel ch-0, and the record #N corresponds to the channel ch-N. In step 130, the CPU 3 opens the address database A 54. Then, in step 131, the CPU 3 reads a record whose record number is equal to the value of the channel variable (CH) from the address database A 54, and stores the URL character string in the record in the URL buffer of the data memory 5. Thereafter, the CPU 3 closes the address database A 54 in step 132.

A process of registering a URL character string in the address database A 54 will be described below. If the registration flag (Flag)=1 in step 102 shown in FIG. 9, i.e., if the user presses the registration key 41 in the channel selection process, then the CPU 3 calls the registration process A in step 107. The registration process A is a process of registering a URL character string inputted from the channel remote-controller 2 by the user, in a presently selected channel. A URL is a character string comprising alphabetical letters, numerals, and certain symbols. In a URL, at least a domain name portion, upper- or lower-cases of alphabetical letters are usually ignored. In this embodiment, alphanumeric characters and symbols can be inputted using the numeric keys of the channel remote-controller 2 through a user interface described below. As shown in FIG. 5, three alphabetical letters are assigned to each of the numeric keys 25–32, two alphabetical letters are assigned to the numeric key 33, and three symbols are assigned to the numeric key 34. For example, the alphabetical letters "A", "B", "C" as well as the numeral "1" are assigned to the numeric key 25. The alphabet selection keys 36–38 on the channel remote-controller 2 are indicated by "SEL 1", "SEL 2", and "SEL 3", respectively.

If one of the numeric keys is pressed without any of the alphabet selection keys 36–38 being pressed, then the numeral assigned to the pressed numeric key is inputted. If one of the numeric keys is pressed after the first alphabet selection key ("SEL 1") 36 is pressed, the leftmost one of the three alphabetical letters assigned to the pressed numeric key is inputted. If one of the numeric keys is pressed after the second alphabet selection key ("SEL 2") 37 is pressed, the central one of the three alphabetical letters assigned to the pressed numeric key is inputted. If one of the numeric keys is pressed after the third alphabet selection key ("SEL 3") 38 is pressed, the rightmost one of the three alphabetical letters assigned to the pressed numeric key is inputted. If the numeric key 34 (representing "0") is pressed without any of the alphabet selection keys 36~38 being pressed, then the numeral "0" assigned to the pressed numeric key 34 is inputted. If the numeric key 34 is pressed after the first alphabet selection key ("SEL 1") 36 is pressed, then a symbol ":" assigned to the numeric key 34 is inputted.

Figure 12:
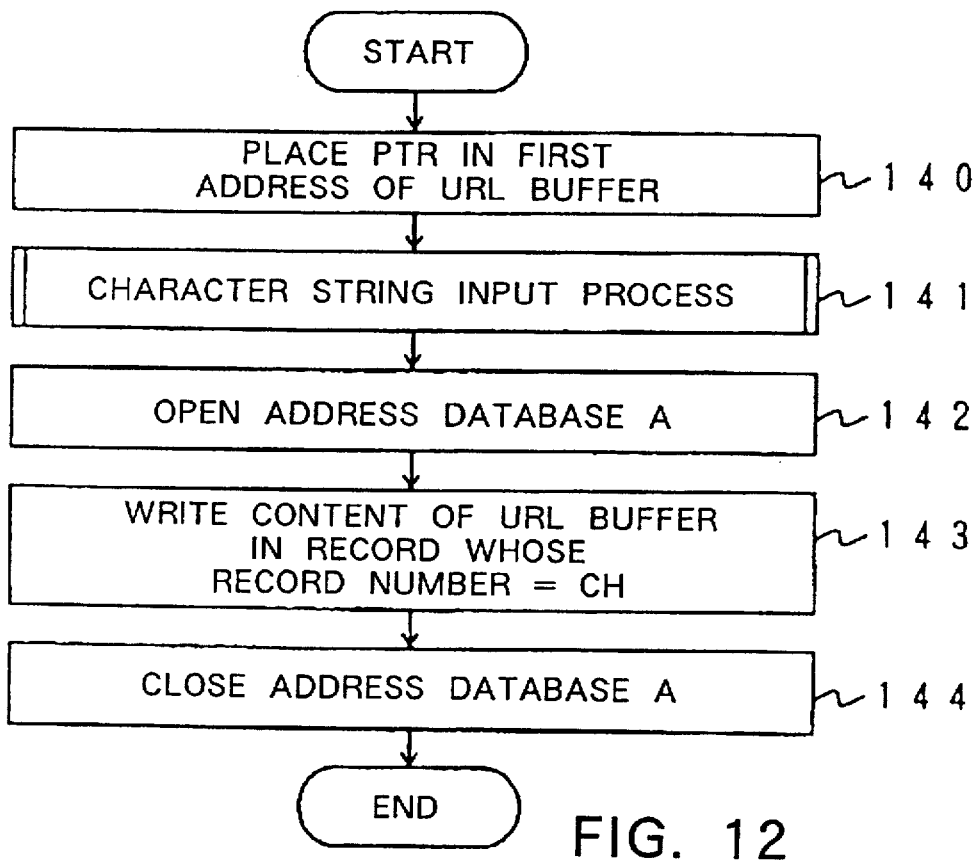
FIG. 12 is a flowchart of an operation sequence of a registration process in the information service terminal according to the first embodiment.

The registration process A will be described with reference to a flowchart shown in FIG. 12. The CPU 3 places the value of the buffer pointer (PTR) in the control information 53 stored in the data memory 5 into first address of the URL buffer in the data memory 5 in step 140. Then, the CPU 3 calls a character string input process in step 141, and stores a character string, i.e., a URL, inputted by the user from the channel remote-controller 2 into the URL buffer. The CPU 3 opens the address database A 54 in step 142, and then stores, into a record whose record number agrees with the value of the variable "CH", i.e., a record corresponding to the presently selected channel, the character string in the URL buffer, i.e., an URL to be newly set to this channel, in step 143. Thereafter, the CPU 3 closes the address database A 54 in step 144. The registration process A now comes to an end. When the registration process A is finished, a Web page represented by the URL character string newly set to the channel is read from the Internet 52 and displayed on the display unit 9 as shown in steps 104~106 in FIG. 9.

Figure 13:
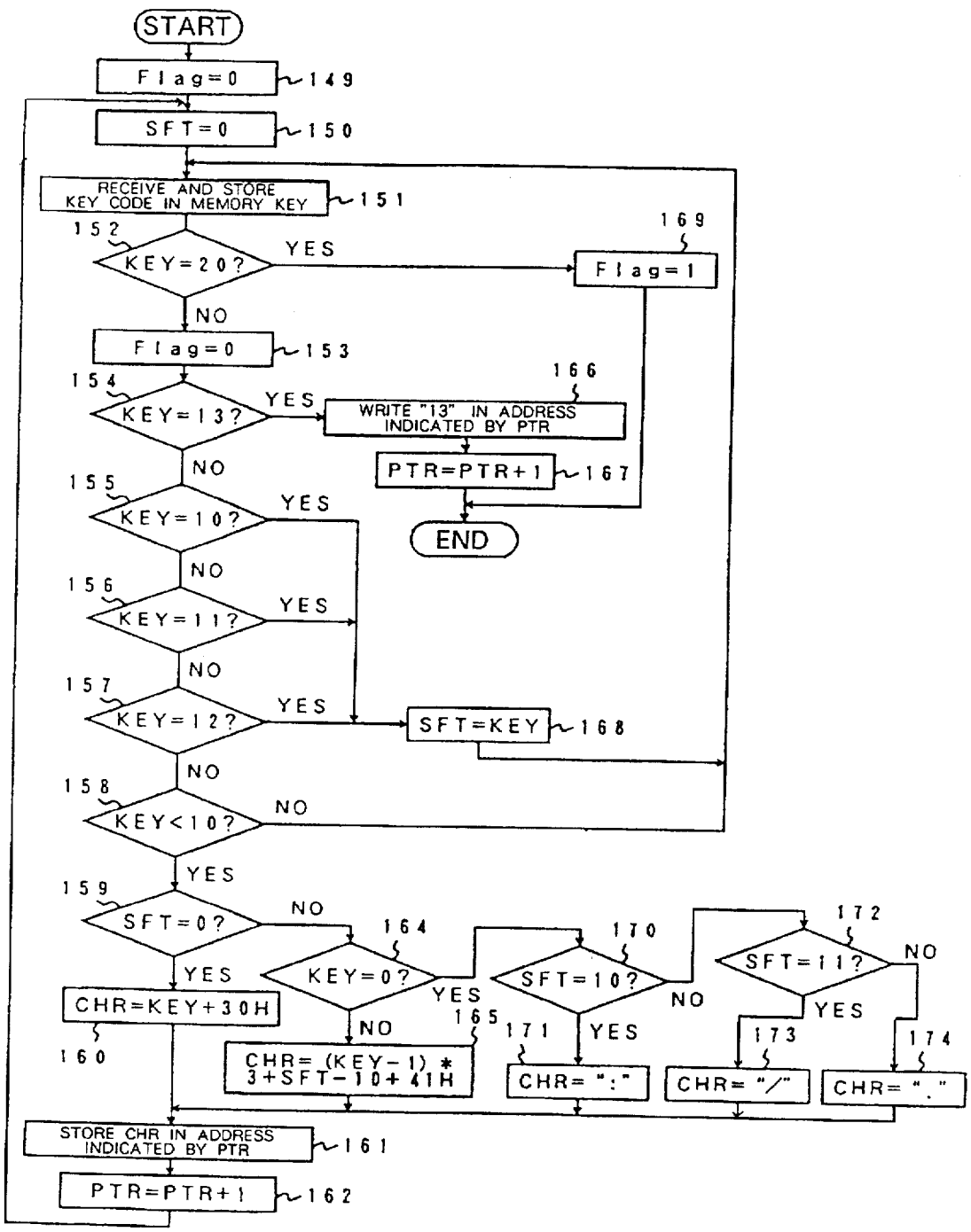
FIG. 13 is a flowchart of an operation sequence of a character string input process in the information service terminal according to the first embodiment.

The character string input process in step 141 shown in FIG. 12 will be described below with reference to FIG. 13. First, the CPU 3 clears the registration flag (Flag) to "0" in step 149. Then, the CPU 3 sets the alphabet shift flag (SFT) to "0" in step 150, and reads the key code of a key which is pressed by the user with the channel remote-controller 2 and stores the key code into the key code memory (KEY) in step 151. In a next step 152, the CPU 3 determines whether the key code stored in the key code memory KEY is "20" (KEY=20) or not, i.e., whether-the pressed key is the registration key 41 or not. If KEY=20, then the CPU 3 sets the registration flag (Flag) to "1" in step 169, and finishes the character string input process. If KEY≠20, then the CPU 3 resets the registration flag (Flag) to "0" in step 153, and determines in step 154 whether the key code stored in the key code memory KEY is "13" (KEY=13) or not, i.e., whether the pressed key is the carriage return key 35 or not. If KEY=13, the CPU 3 stores a character code "13" representing the end of a character string into an address indicated by the buffer pointer (PTR) in step 166, and thereafter updates the buffer pointer (PTR) in step 167, after which the character string input process comes to an end.

If KEY≠13 in step 154, then the CPU 3 determines whether the key code stored in the key code memory KEY is "10", "11", or "12" (KEY=10, 11, or 12), i.e., whether the pressed key is either one of the alphabet selection keys or not, in respective steps 155, 156, 157. If the pressed key is either one of the alphabet selection keys, then the CPU 3 substitutes the value of KEY in the alphabet shift flag (SFT) in step 168, and thereafter control returns to step 151 in order to process a next key code. If the pressed key is not any alphabet selection key, then the CPU 3 determines in step 158 whether the key code stored in the key code memory KEY is smaller than "10" (KEY<10) or not, i.e., whether the pressed key is either one of the ten numeric keys 25~34 or not. If KEY>10, then control returns to step 151 in order to process a next key code. If KEY<10, then CPU 3 determines whether the value of the alphabet shift flag (SFT) is "0" (SFT=0) or not in step 159.

If SFT=0, then the CPU 3 adds "30H" to the key code stored in the key code memory KEY in step 160, converting the stored key code into an ASCII character code, and stores the ASCII character code into the character code buffer (CHR). Thereafter, control proceeds to step 161. The letter "H" which follows the numeral "30" added to the stored key code in step 160 represents that the numeral "30" is a hexadecimal representation. When either one of the numeric keys 25~34 is pressed without any of the alphabet selection keys 36~38 being pressed, the pressed numeric key generates a character code of the numeral which is assigned to the pressed numeric key. For example, when the numeric key 34 representing the numeral "0" is pressed, the character code "30H" of the numeral "0" is generated.

If SFT≠0 in step 159, then the CPU 3 determines in step 164 whether the key code stored in the key code memory KEY is "0" (KEY=0) or not, i.e., whether the pressed key is the numeric key 34 or not. If the pressed key is not the numeric key 34, then the CPU 3 calculates a character code of a selected alphabetical letter in step 165, according to the equation:

$$CHR=(KEY)*3+SFT-10+41H$$

and stores the calculated character code into the character code buffer (CHR). For example, when the numeric key 25 representing the numeral "1" is pressed after the first alphabet selection key ("SEL 1") 36 is pressed, the leftmost alphabetical letter "A" of the three alphabetical letters assigned to the numeric key 25 is selected, and a character code "41H" corresponding to the alphabetical letter "A" is generated. After the character code is generated in step 165, control proceeds to step 161.

If KEY=0 in step 164, then the CPU 3 determines in step 170 whether the value of the alphabet shift flag (SFT) is "10" (SFT=10) or not, i.e., whether the key pressed before the numeric key 34 is pressed is the first alphabet selection key ("SE1 1") 36 or not, in order to select a symbol. If SFT=10, then the CPU 3 generates CHR=":" in step 171, after which control goes to step 161. If SFT≠10, then the CPU 3 determines in step 172 whether SFT=11 or not. If SFT=11, then the CPU 3 generates CHR="/" in step 173, after which control goes to step 161. If SFT≠11, then the CPU 3 generates CHR="." in step 174, after which control goes to step 161.

In step 161, the CPU 3 stores the value of the character code buffer (CHR) into the data memory 5 at an address indicated by the buffer pointer (PTR). Thereafter, the CPU 3 increments the value of the buffer pointer (PTR) by "1" in step 162. Control then goes back to step 150 to clear the alphabet shift flag (SFT) to "0", and thereafter repeats steps 115~174.

The information service terminal according to the first embodiment of the present invention allows the user to access desired Web pages simply by changing channels with the channel remote-controller 2 without the need for complex processes of operating a keyboard or a mouse. Therefore, the user finds it quite easy to use information services available on the Internet.

Second Embodiment

An information service terminal according to a second embodiment of the present invention will be described below. The information service terminal according to the second embodiment is designed to use information services available as personal computer communication services or BBSs provided by a plurality of network service companies. The information service terminal according to the second embodiment is capable of accessing a plurality of electronic conference rooms in a single operation with respect to each of the personal computer communication services. The information service terminal according to the second embodiment has 100 channels ch-0 through ch-99. A personal computer communication service to be connected and a list of command character strings for calling information from the personal computer communication service are registered in advance with respect to each of the 100 channels. When a desired channel is selected from a channel remote-controller, the information service terminal according to the second embodiment is connected to the personal computer communication service that is registered for the selected channel, and reads and displays desired information in accordance with the registered list of command character strings.

The information service terminal according to the second embodiment is similar in structure to the information service terminal according to the first embodiment, and comprises an information service terminal unit which is similar to the information service terminal unit 1 according to the first embodiment shown in FIG. 3 and a channel remote-controller similar to the channel remote-controller 2 according to the first embodiment shown in FIG. 4. Therefore, the parts of the information service terminal unit and the channel remote-controller according to the second embodiment will be denoted by reference numerals identical to those according to the first embodiment.

The information service terminal according to the second embodiment differs from the information service terminal according to the first embodiment in that the file device 6 stores a communication service information database 56 (see FIG. 14 ) and an address database B 57 (see FIG. 15), the data memory 5 stores control information of different structure, and the program memory 4 stores a control program which operates differently.

FIG. 14 shows the structure of the communication service information database 56. The communication service information database 56 comprises one or a plurality of records each corresponding to a personal computer communication service and including a communication service name field 180 for holding the name of the personal computer communication service, a telephone number field 181 for holding a telephone number to call the personal computer communication service, a login name field 182 for holding a login name for logging in the personal computer communication service, and a password field 183 for holding a password for logging in the personal computer communication service. If the telephone number field 181 of a record is empty, then it means that the record is empty.

FIG. 15 shows the structure of the address database B 57. The address database B 57 has100 5(Flag) records corresponding to the respective 100 channels. Each of the records includes an identifier field 190 for holding an identifier for identifying a personal computer communication service and a command character string field 191 for holding a list of one or more command character strings to call in a menu or item of a personal computer communication service. A record #0 corresponds to a channel ch-0, and a record #N corresponds to a channel ch-N. A record number in the communication service information database 56 is used as an identifier recorded in the identifier field 190. For example, an identifier "1" signifies a personal computer communication service registered in the record #1 in the communication service information database 56.

FIG. 16 shows control information 58 stored in the data memory 5. As shown in FIG. 16, the control information 58 includes a registration flag (Flag), a channel variable (CH), a buffer pointer (PTR), an alphabet shift flag (SFT), a key code memory (KEY), a character code buffer (CHR), a login variable (LOGIN), an identifier buffer (ID), a communication service name buffer, a telephone number buffer, a login name buffer, a password buffer, and a command character string buffer.

Figure 17:
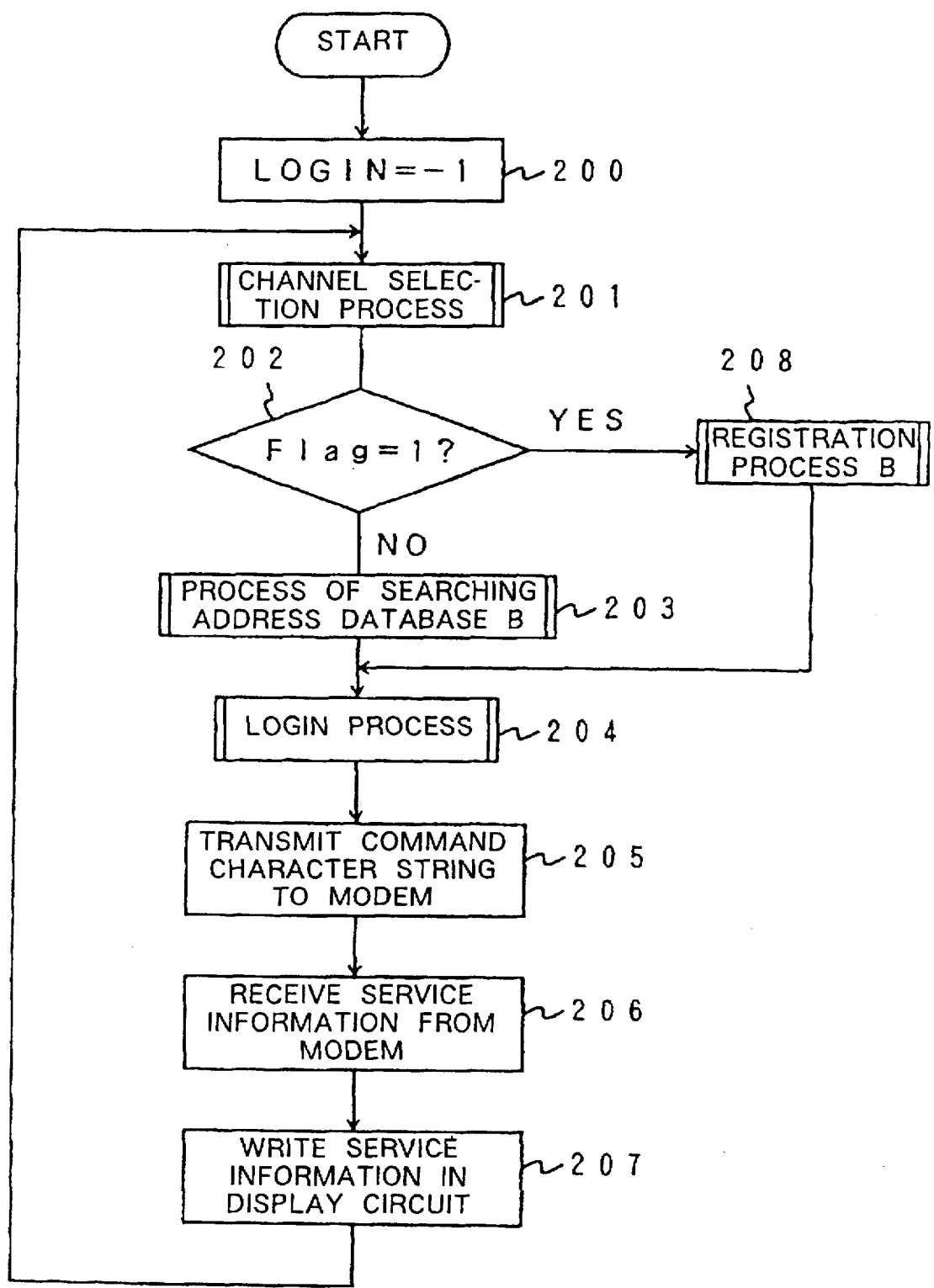
FIG. 17 is a flowchart of an operation sequence of a control program in the information service terminal according to the second embodiment.

A sequence of operation of the control program for controlling the information service terminal according to the second embodiment will be described below with reference to a flowchart shown in FIG. 17.

In step 200, the CPU 3 initializes the variable (LOGIN) to "−1". The variable (LOGIN) is a variable for holding the identifier of a personal computer communication service to which the information service terminal is presently connected. The value "−1" of the variable (LOGIN) indicates that the information service terminal is not presently connected to any personal computer communication service. Then, the CPU 3 calls a channel selection process in step 201. The channel selection process is the same as the channel selection process according to the first embodiment. After the channel selection process, the CPU 3 checks if the registration flag (Flag) is "1" (Flag=1) or not in step 202. If Flag=1, then since the registration key 41 is pressed in the channel selection process, the CPU 3 calls a registration process B in step 208, and then control goes to step 204. If Flag=0 in step 202, then since a channel number is specified in the channel selection process, the CPU 3 calls a process of searching the address database B 57 in step 203, and then control goes to step 204. As described later on, in the process of searching the address database B 57, the value of the identifier field 190 of the record which is indicated by the channel variable (CH), i.e., the value of the identifier indicative of the personal computer communication service registered in the channel, is given to the identifier buffer (ID), and the value of the command character string field 191 is given to the command character string buffer. The CPU 3 then calls a login process in step 204, logging in the personal computer communication service registered in the channel which is selected. After logging in the personal computer communication service, in step 205, the CPU 3 transmits a list of command character strings stored in the command character string buffer to the center of the personal computer communication service thereby to call a selected menu or item. The CPU 3 then receives data of the selected menu or item through the modem from the center of the personal computer communication service in step 206. Thereafter, the CPU 3 writes the received data in the display circuit 8 to display them on the display unit 9 in step 207. Thereafter, control goes back to step 201.

Figure 18:
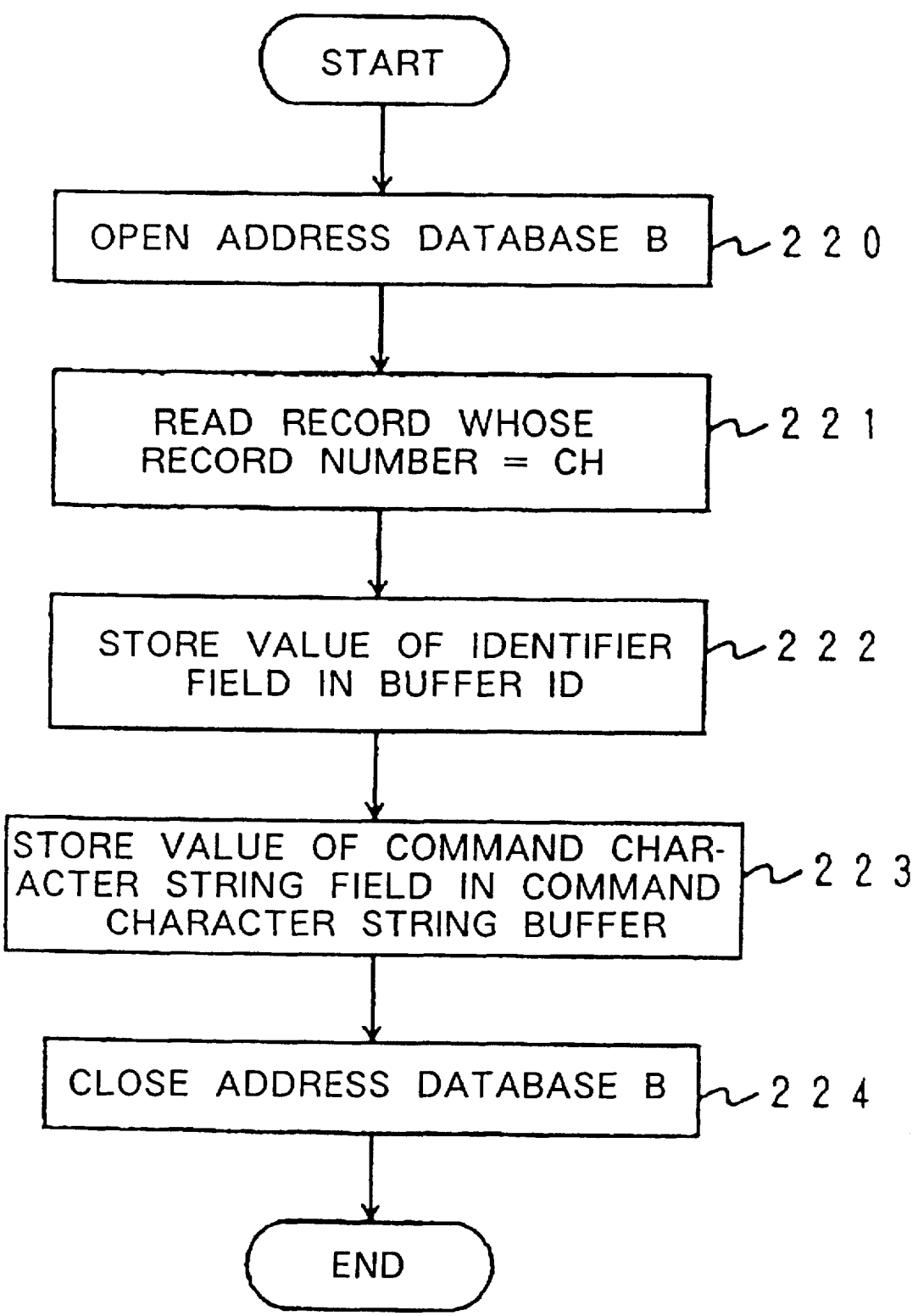
FIG. 18 is a flowchart of an operation sequence of a process of searching the address database in the information service terminal according to the second embodiment.

The process of searching the address database B 57 in step 203 shown in FIG. 17 will be described below with reference to a flowchart shown in FIG. 18. The CPU 3 opens the address database B 57 in step 220. Then, in step 221, the CPU 3 reads a record whose record number is equal to the value of the channel variable (CH). The CPU 3 stores the value of the identifier field 190 of the read record into the identifier buffer (ID) in step 222, and then stores the value of the command character string field 191 of the record into the command character string buffer in step 223. Thereafter, the CPU 3 closes the address database B 57 in step 224. The process of searching the address database B 57 is now completed.

Figure 19:
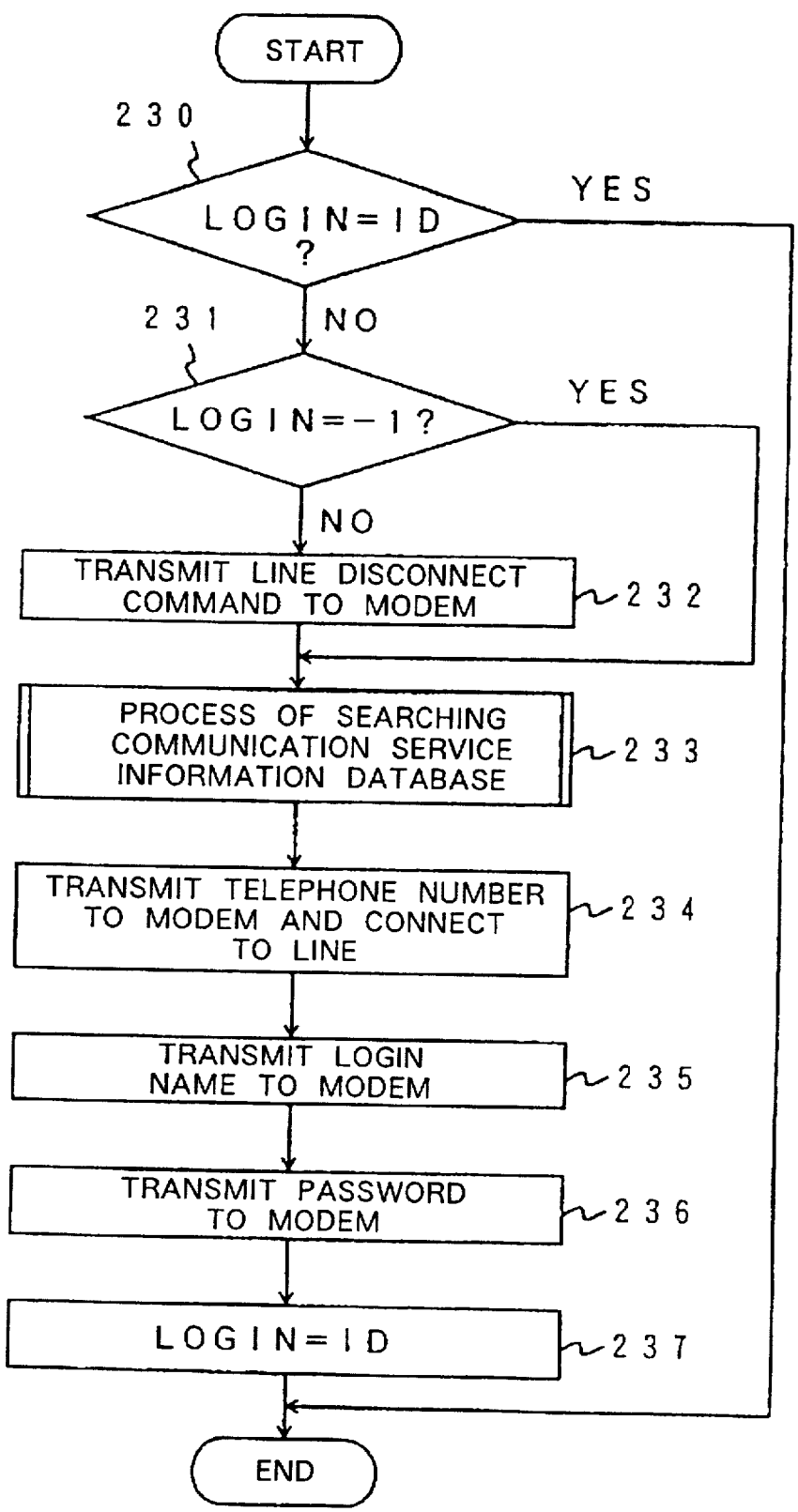
FIG. 19 is a flowchart of an operation sequence of a login process in the information service terminal according to the second embodiment.

The login process in step 204 shown in FIG. 17 will be described below with reference to a flowchart shown in FIG. 19. In step 230, the CPU 3 compares the variable (LOGIN) which holds the identifier of the personal computer communication service, which the information service terminal is presently logging in, with the value of the identifier buffer (ID), i.e., the identifier of a personal computer communication service which is selected. If the variable (LOGIN) and the value of the identifier buffer (ID) are the same as each other (LOGIN=ID), then since the information service terminal is presently logging in the selected personal computer communication service, the login process is ended. If LOGIN≠ID, then the CPU 3 ascertains whether LOGIN=−1 or not in step 231. If LOGIN=−1, then since the information service terminal is not presently logging in any personal computer communication service, control jumps to step 233. If LOGIN≠−1, then since the information service terminal is presently logging in another personal computer communication service, the CPU 3 issues a line disconnect command to the modem in step 232 to log out of the personal computer communication service presently logged in. Thereafter, control proceeds to step 233.

In step 233, the CPU 3 calls a process of searching the communication service information database 56, and acquires a telephone number to connect to the selected personal computer communication service and a login name and a password for logging in the selected personal computer communication service. The CPU 3 then dials the telephone number through the modem to connect to the selected personal computer communication service in step 234. The CPU 3 transmits the login name through the modem in step 235, and transmits the password through the modem in step 236. The information service terminal now logs in the selected personal computer communication service. Finally, in step 237, the CPU 3 places the value of the identifier buffer (ID), which represents the identifier of the personal computer communication service which the information service terminal is currently logging in, into the variable (LOGIN). The login process now comes to an end.

Figure 20:
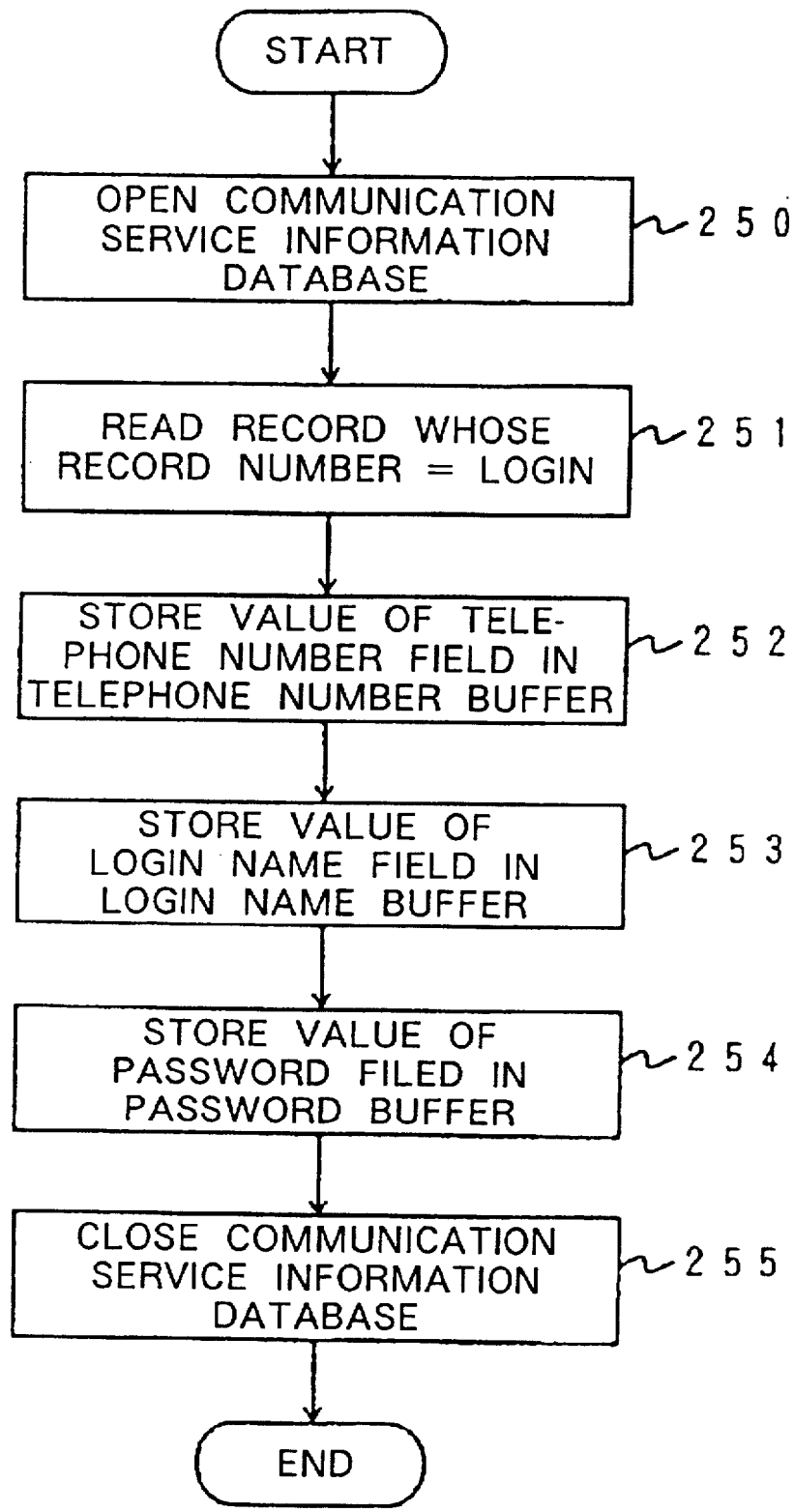
FIG. 20 is a flowchart of an operation sequence of a process of searching a communication service information database in the information service terminal according to the second embodiment.

The process of searching the communication service information database 56 in step 233 shown in FIG. 19 will be described below with reference to a flowchart shown in FIG. 20. In step 250, the CPU 3 opens the communication service information database 56. In step 251, the CPU 3 reads a record whose record number is equal to the value of the variable (LOGIN). The CPU 3 then stores the value of the telephone number field 181 of the read record into the telephone number buffer in step 252, stores the value of the login name field 182 into the login name buffer in step 253, and stores the value of the password field 183 into the password buffer in step 254. The CPU 3 then closes the communication service information database 56 in step 255. Thereafter, the process of searching the communication service information database 56 is finished.

Figure 21:
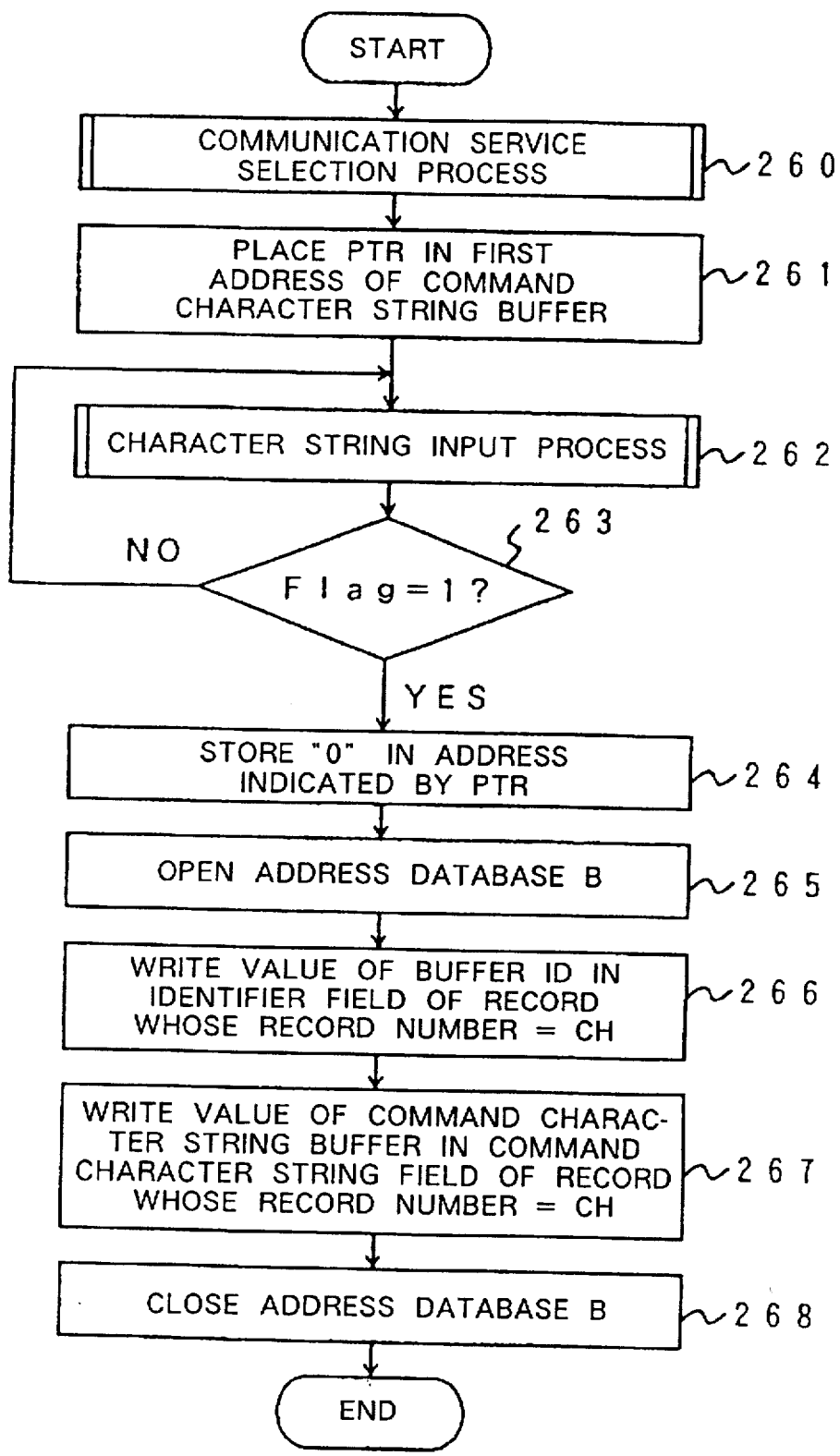
FIG. 21 is a flowchart of an operation sequence of a registration process in the information service terminal according to the second embodiment.

The registration process B in step 208 shown in FIG. 17 will be described below. The registration process B is a process of registering the identifier of a personal computer communication service and the list of command character strings for calling in menus and items of the personal computer communication service into the address database B 57. The identifier and the list of command character strings have been inputted by the user from the channel remote-controller 2. As described above, the registration process B is called in by the CPU 3 when Flag=1 in step 202 (see FIG. 17) of the control program, i.e., when the user presses the registration key 41 in the channel selection process. The registration process B registers the identifier and the list of command character strings of a personal computer communication service into the presently selected channel which is indicated by the channel variable (CH). FIG. 21 is a flowchart of the registration process B.

As shown in FIG. 21, the CPU 3 first calls a communication service selection process in step 260, as a result, the identifier of a personal computer communication service is placed into the identifier buffer (ID). Then, the CPU 3 places the value of the buffer pointer (PTR) into a first address of the command character string buffer in step 261, and calls a character string input process in step 262. The character string input process is the same as the character string input process according to the first embodiment shown in FIG. 13. Since some personal computer communication services use upper-case alphabetical letters, the character string input process generates character codes of upper-case alphabetical letters rather than lower-case alphabetical letters. Furthermore, the personal computer communication services may require that a space be inserted between a command and an argument with respect to the command, and do not require the period "." to be inputted in most cases. Therefore, when the numeric key 34 representing "0" on the channel remote-controller 2 is pressed after the third alphabet selection key ("SEL 3",) 38 is pressed, a space character (character code 20H) is inputted into the character code buffer (CHR).

After the character string input process in step 262, the CPU 3 inspects the value of the registration flag (Flag) in step 263. If Flag=1, i.e., if the registration key 41 is pressed in the character string input process, then the inputting of command character strings is finished, and control goes to step 264. If Flag=0, then control returns to step 262 to input a next command character string. Therefore, until the user presses the registration key 41 to indicate the end of the inputting of command character strings, inputted command character strings are connected, and a list of connected command character strings which are inputted is stored in the command character string buffer.

In step 264, the CPU 3 writes the numeral "0"indicative of the end of the list into an address that is indicated by the value of the buffer pointer (PTR). In step 265, the CPU 3 opens the address database B 57. Then, in step 266, the CPU 3 reads a record whose record number is equal to the value of the channel variable (CH), and stores the value of the identifier buffer (ID), i.e., the identifier of the personal computer communication service which is called in by the channel, into the identifier field 190 of the read record. In step 267, the CPU 3 stores the list of command character strings of the command character string buffer, i.e., the list of command character strings in the personal computer communication service for calling in a menu or item to be registered in the channel, into the command character string field 191 of the record. Finally, the CPU 3 closes the address database B 57 in step 268. The registration process B is now completed. After the registration process B control goes to step 204 shown in FIG. 17, and the information service terminal is connected to the registered personal computer communication service, calls the registered menu, receives information corresponding to the menu, and displays the received information.

Figure 22:
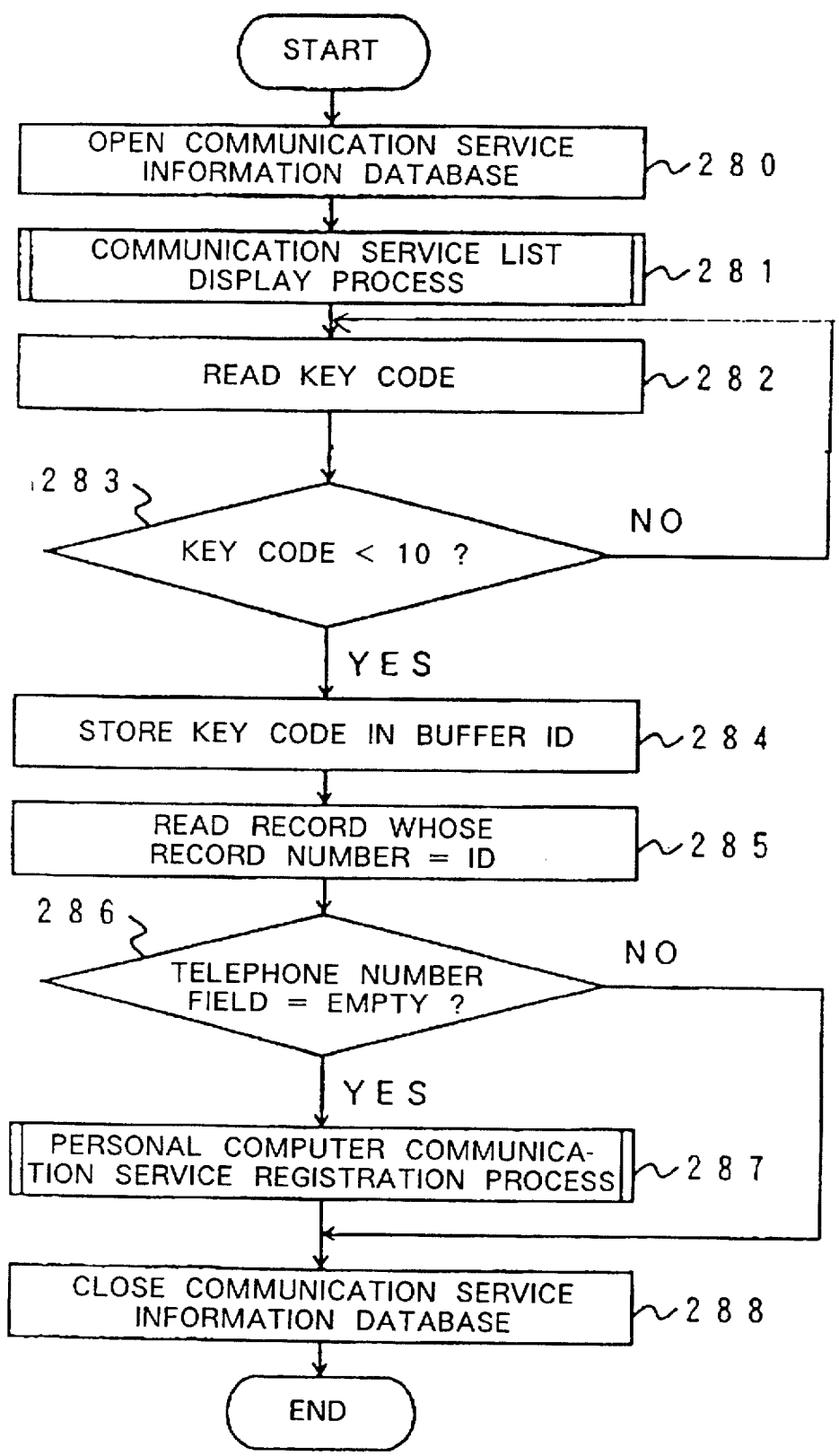
FIG. 22 is a flowchart of an operation sequence of a communication service selection process in the information service terminal according to the second embodiment.

The communication service selection process in step 260 shown in FIG. 21 will be described below with reference to a flowchart shown in FIG. 22.

The CPU 3 opens the communication service information database 56 in step 280 and calls a communication service list display process in step 281. The CPU 3 receives a key code inputted by the user from the channel remote-controller 2 in step 282, and determines whether the key code is less than "10", or not, i.e., whether the key code represents a numeral or not, in step 283. If the key code does not represent a numeral, then control returns to step 282. If the key code represents a numeral, then the CPU 3 stores the key code as the identifier of a personal computer communication service into the identifier buffer (ID) in step 284. The CPU 3 reads a record whose record number coincides with the value of the identifier buffer (ID) from the communication service information database 56 in step 285. The CPU 3 then determines in step 286 whether the telephone number field 181 of the record is empty or not. If the telephone number field 181 is not empty, then since a personal computer communication service has already been registered in the record of the selected identifier buffer (ID), control jumps to step 288. If the telephone number field 181 is empty, then the CPU 3 calls a personal computer communication service registration process in step 287, which is followed by step 288. As described later on, the personal computer communication service registration process in step 287 is a process of registering a new personal computer communication service as a personal computer communication service indicated by the identifier buffer (ID) in the communication service information database 56. In step 288, the CPU 3 closes the communication service information database 56. Thereafter, the communication service selection process is finished.

Figure 23:
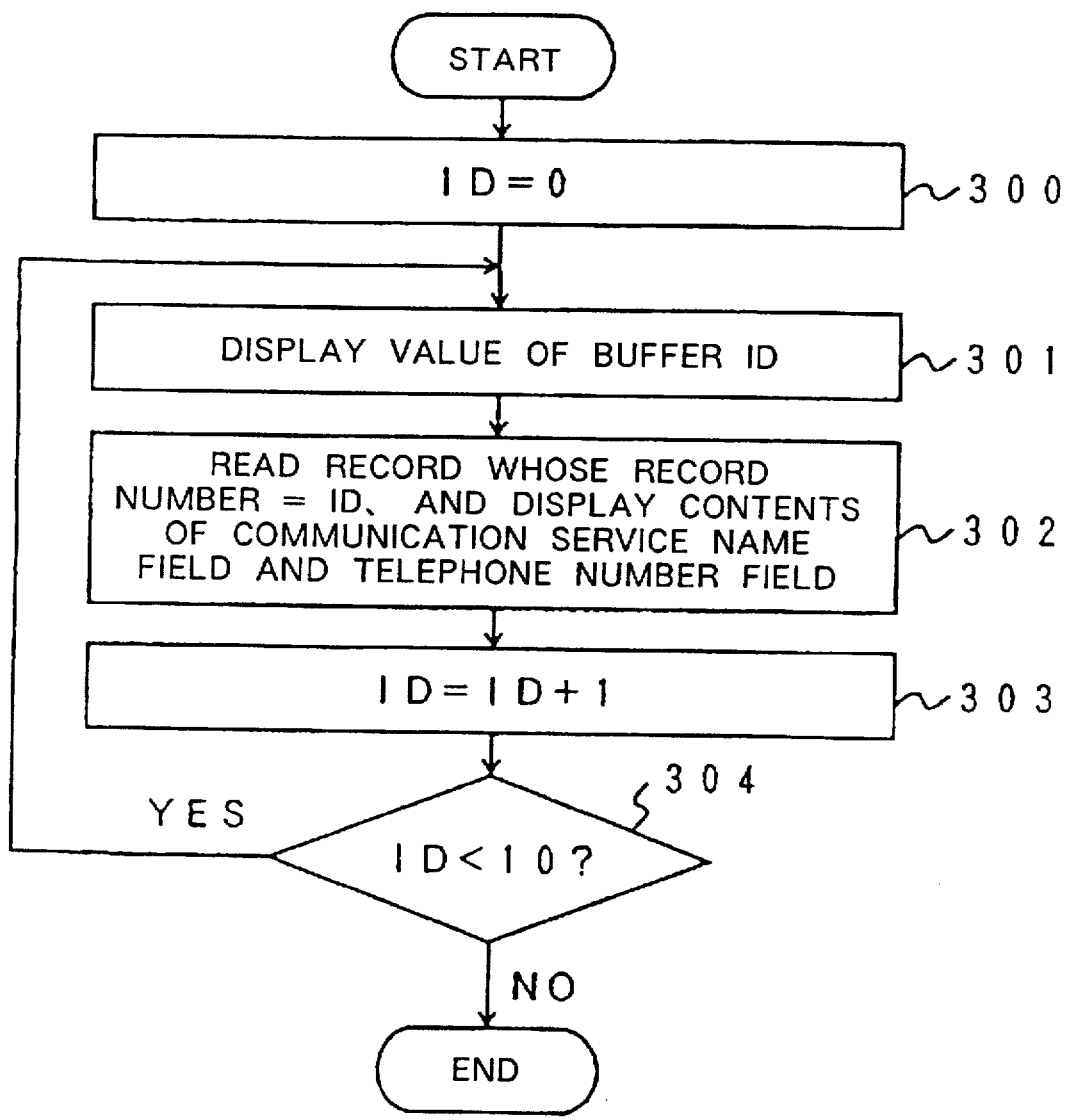
FIG. 23 is a flowchart of an operation sequence of a communication service list display process in the information service terminal according to the second embodiment.

The communication service list display process in step 281 shown in FIG. 22 will be described below with reference to a flowchart shown in FIG. 23.

Figure 24:
FIG. 24 is a view showing an example of a displayed screen image in the communication service list display process in the information service terminal according to the second embodiment.

First, the CPU 3 initializes the identifier buffer (ID) to "0" in step 300, and then displays the value of the identifier buffer (ID) on the display unit 9 in step 301. In a next step 302, the CPU 3 reads a record whose record number coincides with the value of the identifier buffer (ID) from the communication service information database 56, and displays on the display unit 9 the contents of the communication service name field 180 and the telephone number field 181 of the read record. The CPU 3 then adds "1" to the value of the identifier buffer (ID) in step 303, and ascertains whether the value of the identifier buffer (ID) is smaller than "10" (ID<10) or not in step 304. If ID<10, then control returns to step 301 to repeat the display of the contents of the communication service name field 180 and the telephone number field 181 with respect to all records of the communication service information database 56 until ID>10. As a result, the data of the communication service information database 56 are displayed as an image 58, for example, on the display unit 9 as shown in FIG. 24.

Figure 25:
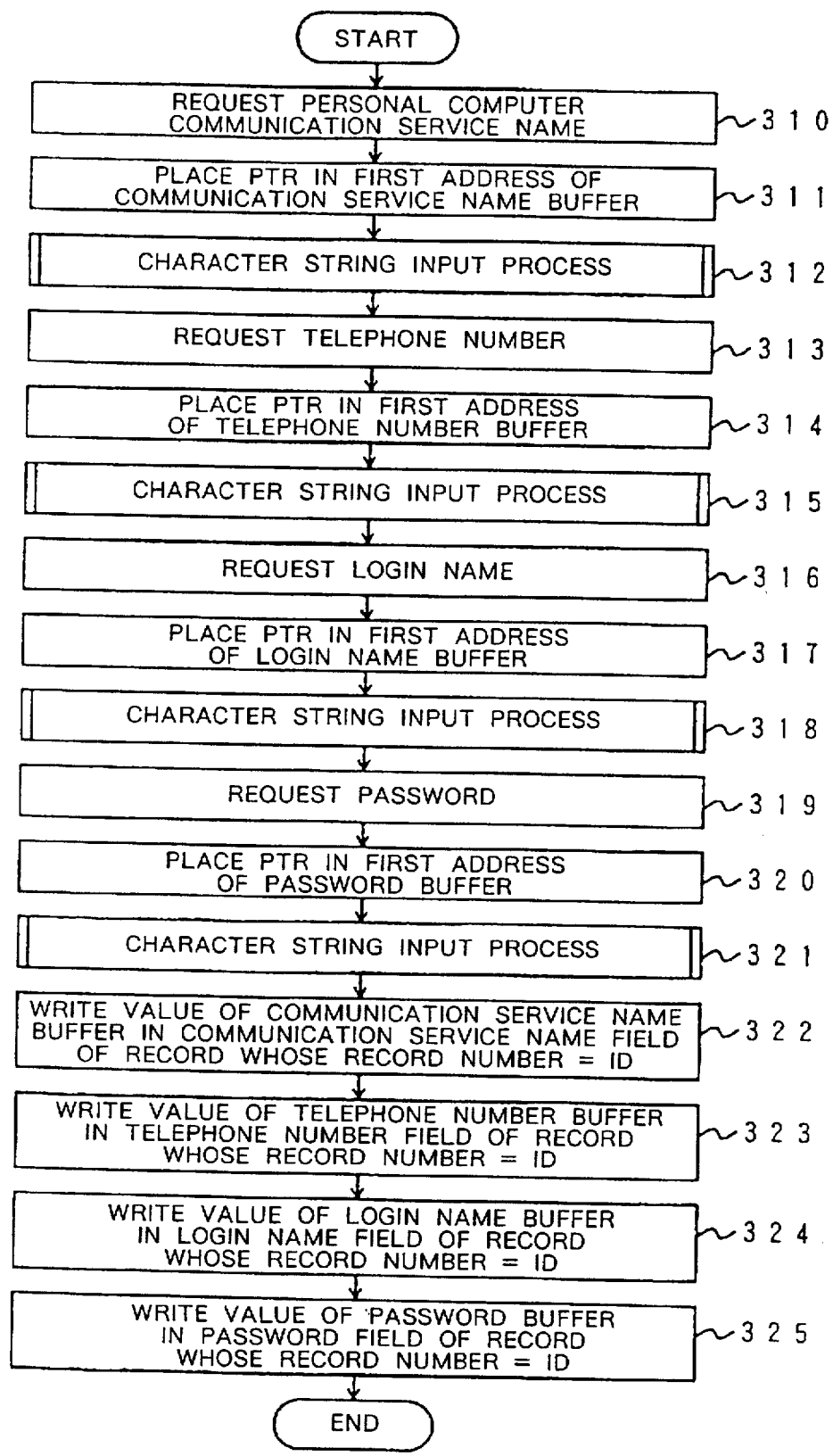
FIG. 25 is a flowchart of an operation sequence of a communication service registration process in the information service terminal according to the second embodiment.

The personal computer communication service registration process in step 287 shown in FIG. 22 will be described below with reference to a flowchart shown in FIG. 25.

First, the CPU 3 displays a message for prompting the user to input the name of a personal computer communication service on the display unit 9 in step 310. The CPU 3 then places the value of the buffer pointer (PTR) into a first address of the communication service name buffer of the data memory 5 in step 311. The CPU 3 then calls a character string input process in step 312. The character string input process in step 312 is the same as the character string input process described above with reference to FIG. 13. The CPU 3 stores a character string inputted by the user from the channel remote-controller 2 into the communication service name buffer.

The CPU 3 displays a message for prompting the user to input the telephone number of the personal computer communication service on the display unit 9 in step 313. The CPU 3 then places the value of the buffer pointer (PTR) into a first address of the telephone number buffer of the data memory 5 in step 314. The CPU 3 then calls the character string input process in step 315. The CPU 3 stores a character string inputted by the user from the channel remote-controller 2 into the telephone number buffer.

The CPU 3 displays a message for prompting the user to input a login name on the display unit 9 in step 316. The CPU 3 then places the value of the buffer pointer (PTR) into a first address of the login name buffer of the data memory 5 in step 317. The CPU 3 then calls the character string input process in step 318. The CPU 3 stores a character string inputted by the user from the channel remote-controller 2 into the login name buffer.

The CPU 3 displays a message for prompting the user to input a password on the display unit 9 in step 319. The CPU 3 then places the value of the buffer pointer (PTR) into a first address of the password buffer of the data memory 5 in step 320. The CPU 3 then calls the character string input process in step 321. The CPU 3 stores a character string inputted by the user from the channel remote-controller 2 into the password buffer.

In step 322, the CPU 3 writes the value of the communication service name buffer into the communication service name field 180 of the record whose record number is the same as the value of the identifier buffer (ID). Similarly, in step 323, the CPU 3 writes the value of the telephone number buffer into the telephone number field 181 of the record whose record number is the same as the value of the identifier buffer (ID). In step 324, the CPU 3 writes the value of the login name buffer into the login name field 182 of the record whose record number is the same as the value of the identifier buffer (ID). In step 325, the CPU 3 writes the value of the password buffer into the password field 183 of the record whose record number is the same as the value of the identifier buffer (ID). Now, the name of the personal computer communication service, the telephone number, the login name, and the password, which have been inputted by the user, are stored in the communication service information data-base 56. The personal computer communication service registration process is then finished.

Third Embodiment

An information service terminal according to a third embodiment of the present invention is a terminal for both receiving television program broadcasts and accessing the Internet to selectively display television programs and Web pages on the Internet by specifying channels. In this embodiment, 99 channels ch-1~ch-99 are defined in the information service terminal, and the channels ch-1~ch-12 are assigned to television channels and the channels ch-13~ch-99 to Web pages.

Figure 26:
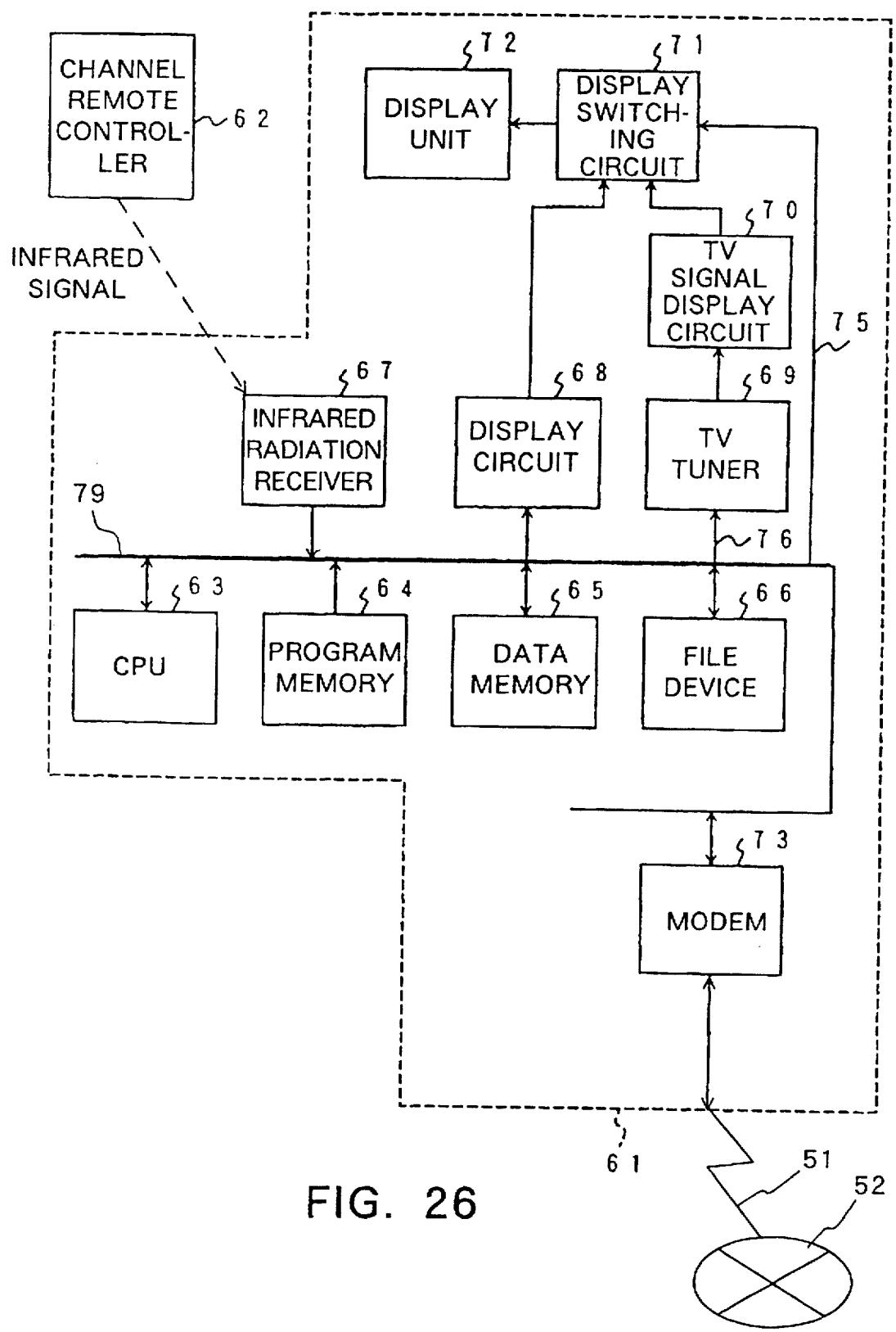
FIG. 26 is a block diagram of an information service terminal according to a third embodiment of the present invention.

As shown in FIG. 26, the information service terminal according to the third embodiment of the present invention generally comprises an information service terminal unit 61 and a channel remote-controller 62. The channel remote-controller 62 is of a structure identical to the channel remote-controller 2 according to the first embodiment.

The information service terminal unit 61 comprises a CPU 63, a program memory 64 which stores a control program, a data memory 65 for storing control information, a file device 66 for storing an address database C, an infrared radiation receiver 67 for receiving control commands from the channel remote-controller 62, a display circuit 68, a television (TV) tuner 69, a TV signal display circuit 70, a display switching circuit 71, a display unit 72, and a modem 73. The CPU 63, the program memory 64, the data memory 65, the file device 66, the infrared radiation receiver 67, the display circuit 68, the TV tuner 69, and the modem 73 are connected to a bus 79. The modem 73 is used to connect this information service terminal to the Internet through a telephone line 51. The control program stored in the program memory 64, the control information stored in the data memory 65, and the address database stored in the file device 66 are different from those stored in the program memory 4, the data memory 5, and the file device 6 according to the first embodiment, respectively.

The TV tuner 69 changes TV channels in response to a TV channel signal 76 supplied from the CPU 63 and outputs a received TV broadcast signal. The TV signal display circuit 70 reproduces the TV broadcast signal from the TV tuner 69 and outputs the reproduced TV broadcast signal to the display switching circuit 71. The display switching circuit 71 is supplied with a display switching signal 75 from the CPU 63. If the display switching signal 75 has a value "1", then the display switching circuit 71 transmits an output signal from the display circuit 68 to the display unit 72. If the display switching signal 75 has a value "0", then the display switching circuit 71 transmits an output signal from the TV signal display circuit 70 to the display unit 72.

Figure 27:
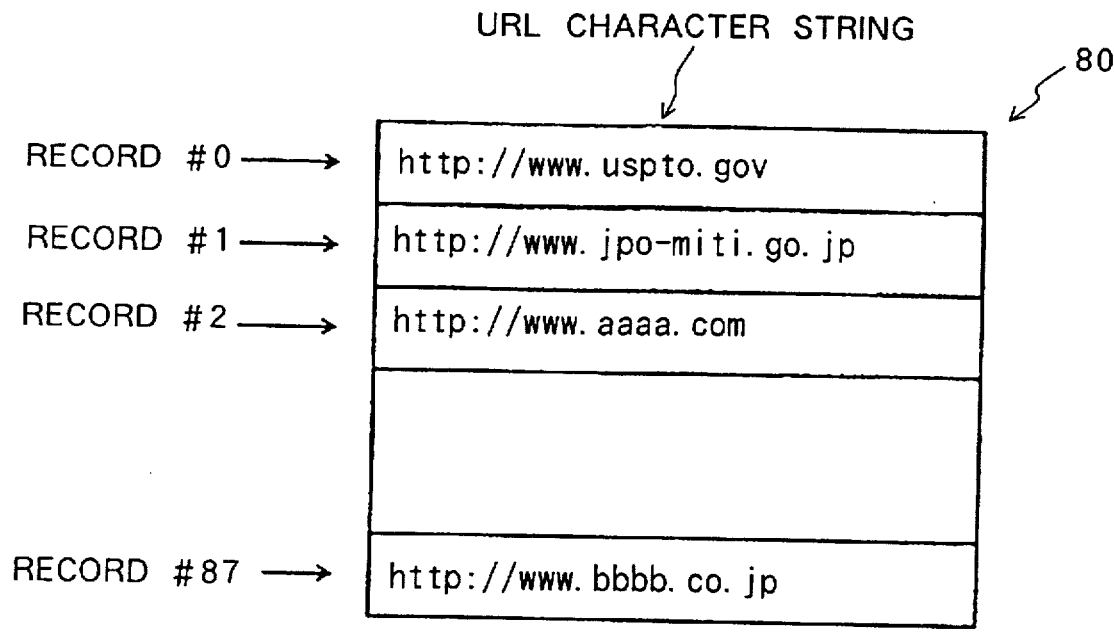
FIG. 27 is a diagram showing the structure of an address database in the information service terminal according to the third embodiment.

An address database C 80 stored in the file device 66 will be described below with reference to FIG. 27. As shown in FIG. 27, the address database C 80 comprises 87 records #1~#87 each storing one URL character string for connecting to a Web page on the Internet. The record #1 corresponds to the channel ch-13 and the record #87 to the channel ch-99. The record #N corresponds to the channel ch-(N+12).

Figure 28:
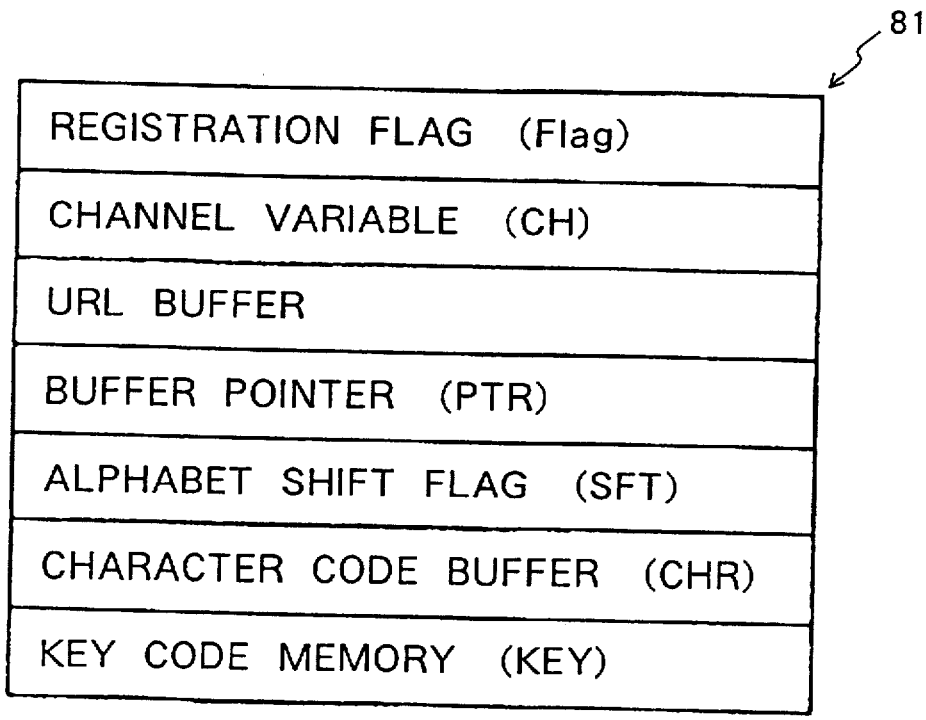
FIG. 28 is a diagram showing the structure of control information in the information service terminal according to the third embodiment.

The data memory 65 stores control information 81 shown in FIG. 28. The control information 81 includes a registration flag (Flag), a channel variable (CH), a URL buffer, a buffer pointer (PTR), an alphabet shift flag (SFT), a character code buffer (CHR), and a key code memory (KEY).

Figure 29:
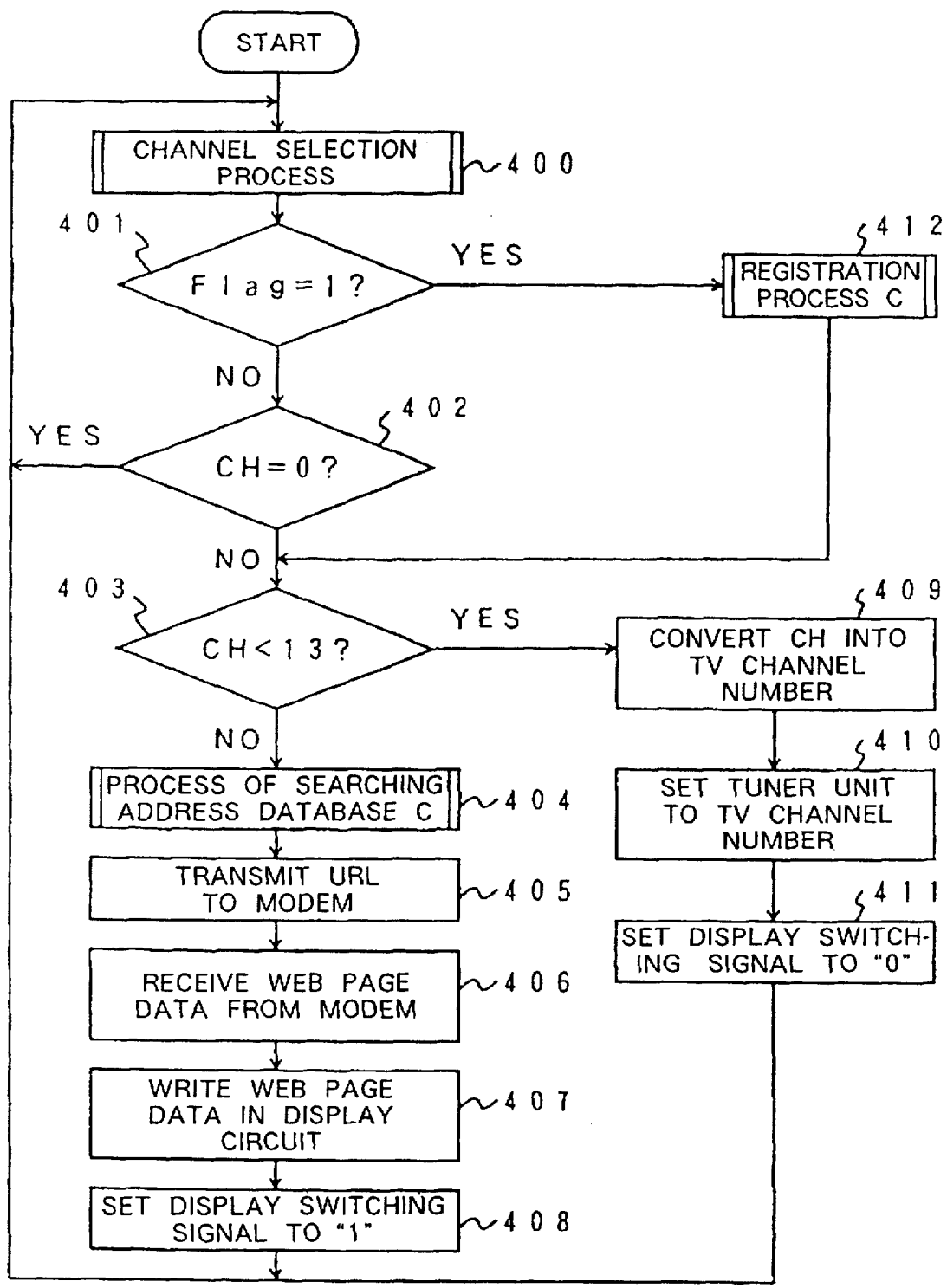
FIG. 29 is a flowchart of an operation sequence of a control program in the information service terminal according to the third embodiment.

Operation of the information service terminal according to the third embodiment will be described below with reference to a flowchart of the control program shown in FIG. 29.

The CPU 63 calls a channel selection process in step 400. The channel selection process in step 400 is identical to the channel selection process according to the first embodiment. The CPU 63 determines whether the value of the registration flag (Flag) is "1" (Flag=1) or not in step 401. If Flag=1, then since the registration key 41 on the channel remote-controller 62 is pressed in the channel selection process, the CPU 63 calls a registration process C in step 412, and control proceeds to step 403. If Flag=0 in step 401, then since a channel number is specified in the channel selection process, the CPU 63 determines whether the value of the channel variable (CH) is "0" (CH=0) or not in step 402. Inasmuch as a channel ch-0 is an invalid channel, if CH=0, then control returns to step 400. If CH≠0, then control proceeds to step 403.

In step 403, the CPU 63 determines whether CH<13, i.e., the value of the channel variable (CH) represents a channel for a Web page or a channel for a TV channel. If CH<13, the CPU 63 the channel of the channel variable (CH) into an actual TV channel number in step 409, and then sets the TV tuner 69 to this TV channel number in step 410. Thereafter, the CPU 63 sets the display switching signal 75 to a value "0" in step 411, after which control returns to step 400. The display switching circuit 71 outputs a TV signal from the TV signal display circuit 70 as a picture signal to the display unit 72, which displays a TV broadcast selected by the user with the channel remote-controller 62.

Figure 30:
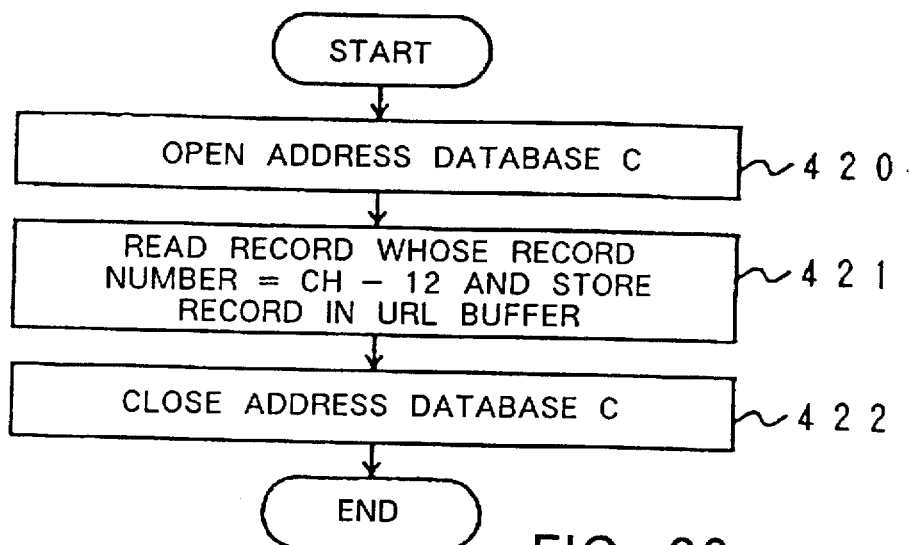
FIG. 30 is a flowchart of an operation sequence of a process of searching the address database in the information service terminal according to the third embodiment.

If CH≧13 in step 403, i.e., if either one of the channels ch-13~ch-99 is selected, then the CPU 63 calls a process of searching the address database C 80 to store a URL character string registered in the channel into the URL buffer in step 404. Then, the CPU 63 transmits the URL character string obtained in the process of searching the address database C 80 from the URL buffer through the modem 73 to the Internet 52 in step 405. Then, the CPU 63 receives the Web page data indicated by the URL in step 406, and writes the received data in the display circuit 68 in step 407. Thereafter, the CPU 63 sets the display switching signal 75 to a value "1" in step 408, after which control returns to step 400. The display switching circuit 71 outputs a signal from the display circuit 68 as a picture signal to the display unit 72, which displays the selected Web page The process of searching the address database C 80 in step 404 shown in FIG. 29 will be described below with reference to a flowchart shown in FIG. 30.

In step 420, the CPU 63 opens the address database C 80. Then, in step 421, the CPU 63 reads a record whose record number agrees with the difference between the channel variable (CH) and "12", and stores the URL character string in the record into the URL buffer. Thereafter, the CPU 63 closes the address database C 80 in step 422. The process of searching the address database C 80 is now ended.

Figure 31:
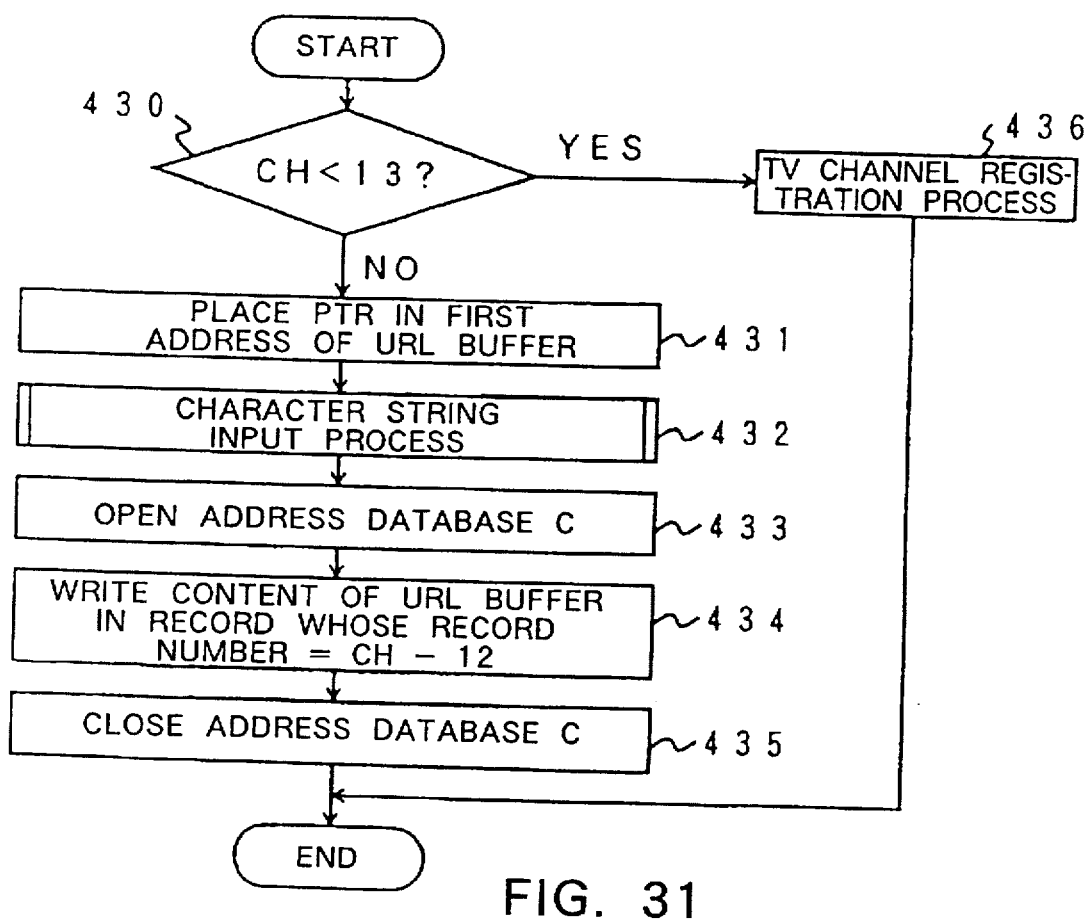
FIG. 31 is a flowchart of an operation sequence of a registration process in the information service terminal according to the third embodiment.

The registration process C in step 412 shown in FIG. 29, i.e., a process of registering an URL character string in the address database C 80, will be described below with reference to a flowchart shown in FIG. 31.

In step 430, the CPU 63 determines whether the value of the channel variable (CH) is smaller than "13", (CH<13) or not, i.e., whether the presently selected channel held in the channel variable (CH) is a TV channel or a channel representing a Web page. If CH<13, i.e., if the presently selected channel is a TV channel, then the CPU 63 calls a TV channel registration process in step 436, and thereafter the registration process C comes to an end. The TV channel registration process is identical to a known process which is widely used to register TV channels with respect to general television receivers.

If CH≧13 in step 430, i.e., if the presently selected channel is either one of the channels ch-13~ch-99, then the CPU 63 places the value of the buffer pointer (PTR) into a first address of the URL buffer in step 431. Then, the CPU 63 calls a character string input process, which is the same as the character string input process shown in FIG. 13, in step 432, and stores a character string, i.e., a URL, inputted by the user from the channel remote-controller 62 into the URL buffer. The CPU 63 opens the address database C 80 in step 433, and then stores, into a record whose record number agrees with the difference between the channel variable (CH) and "12", the character string in the URL buffer, i.e., an URL to be newly set to this channel, in step 434. Thereafter, the CPU 63 closes the address database C 80 in step 435. The registration process C now comes to an end.

Fourth Embodiment

An information service terminal according to a fourth embodiment of the present invention is designed to access Web pages on the Internet, and has a means for storing the contents of Web pages registered in channels, a means for calling Web pages registered in channels at a certain preset time everyday, and a means for reading and displaying a Web page selected with a channel from a list of stored Web pages.

Figure 32:
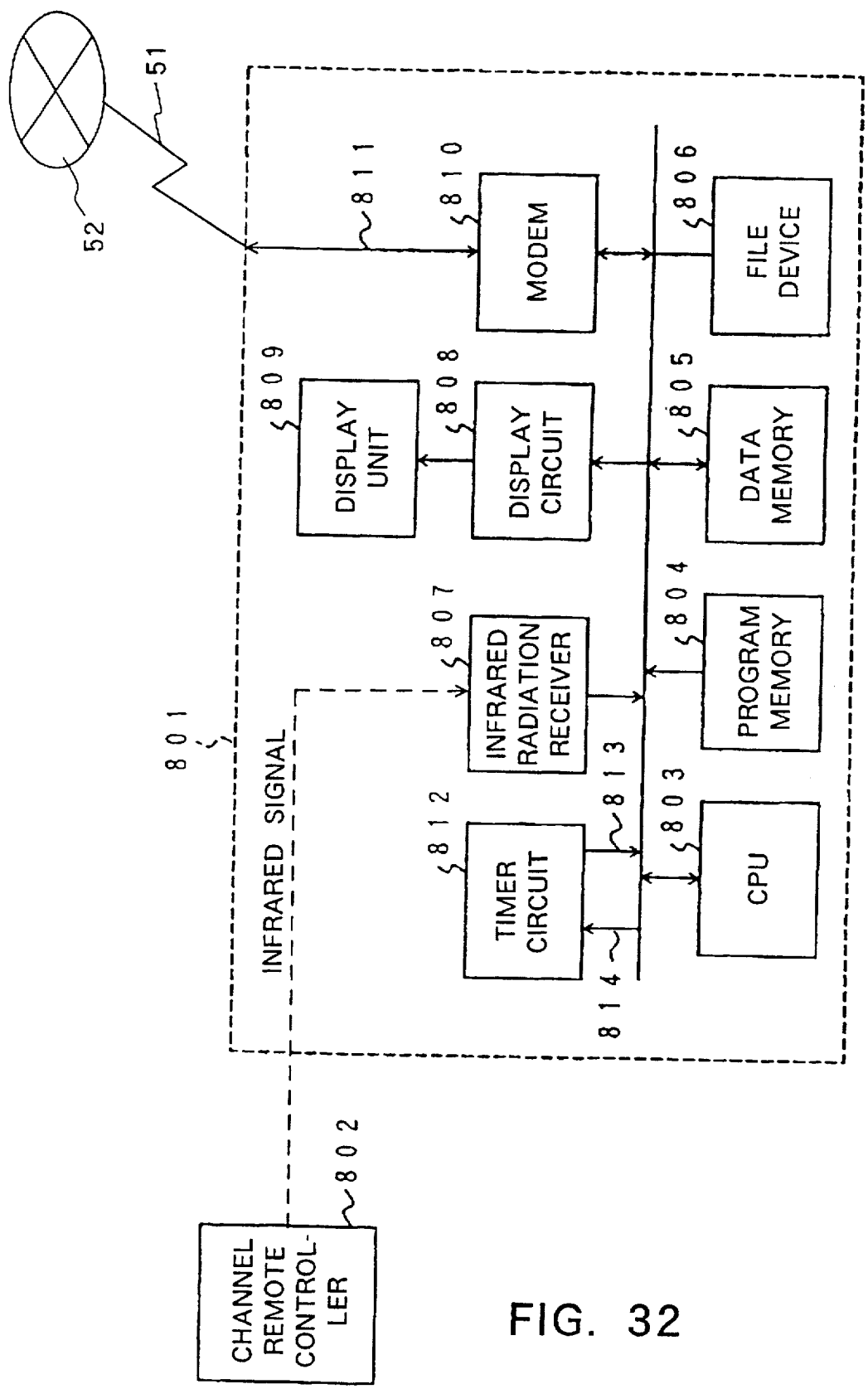
FIG. 32 is a block diagram of an information service terminal according to a fourth embodiment of the present invention.

As shown in FIG. 32, the information service terminal according to the fourth embodiment of the present invention generally comprises an information service terminal unit 801 and a channel remote-controller 802. The information service terminal unit 801 is of a structure essentially identical to the information service terminal unit 1 according to the first embodiment. The information service terminal unit 801 comprises a CPU 803, a program memory 804, a data memory 805, a file device 806, an infrared radiation receiver 807, a display circuit 808, a display unit 809, a modem 810, and a timer circuit 812. The channel remote-controller 802 is of a structure identical to the channel remote-controller 2 according to the first embodiment. In this embodiment, the file device 806 stores an address database which is the same as the address database A 54 according to the first embodiment, and a Web page database 85 (see FIG. 34). The program memory 804 stores a control program which is different from the control program according to the first embodiment. The modem 810 is connected to the Internet 52 through a telephone line 51.

Figure 33:
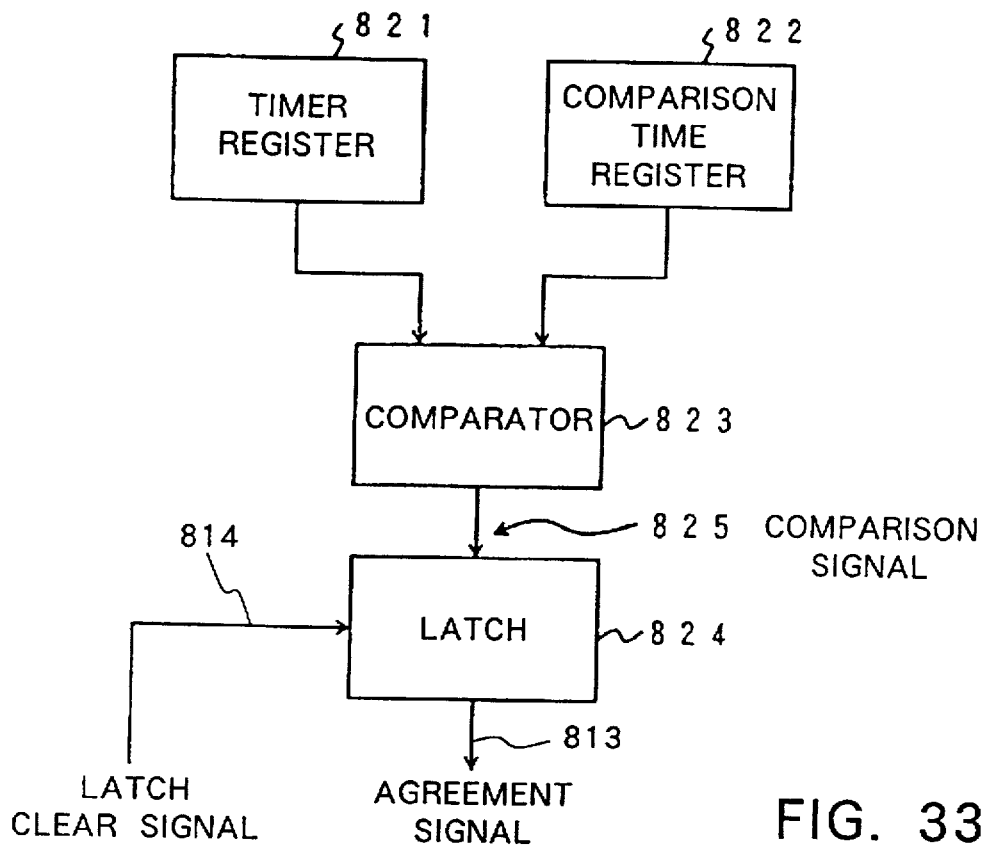
FIG. 33 is a block diagram of a timer circuit in the information service terminal according to the fourth embodiment.

The timer circuit 812 will be described below with reference to FIG. 33. The timer circuit 812 comprises a timer register 821 for measuring present time, a comparison time register 822 for storing a preset time, a comparator 823 for comparing the contents of the timer register 821 and the comparison time register 822 at all times, and a latch 824. The timer register 821 outputs the present time to the comparator 823. The comparator 823 compares the contents of the timer register 821 and the comparison time register 821 at all times, and outputs a comparison signal 825 which has a value of "1" when the compared contents agree with each other. The latch 824 latches the comparison signal 825, and outputs an agreement signal 813 which has a value of "1" and holds the agreement signal 813 having the value of "1" when the value of the comparison signal 825 becomes "1". The agreement signal 813 is cleared to a value of "0" when the CPU 803 supplies a latch clear signal 814 in the form of a pulse having a value of "1" to the latch 824.

Figure 34:
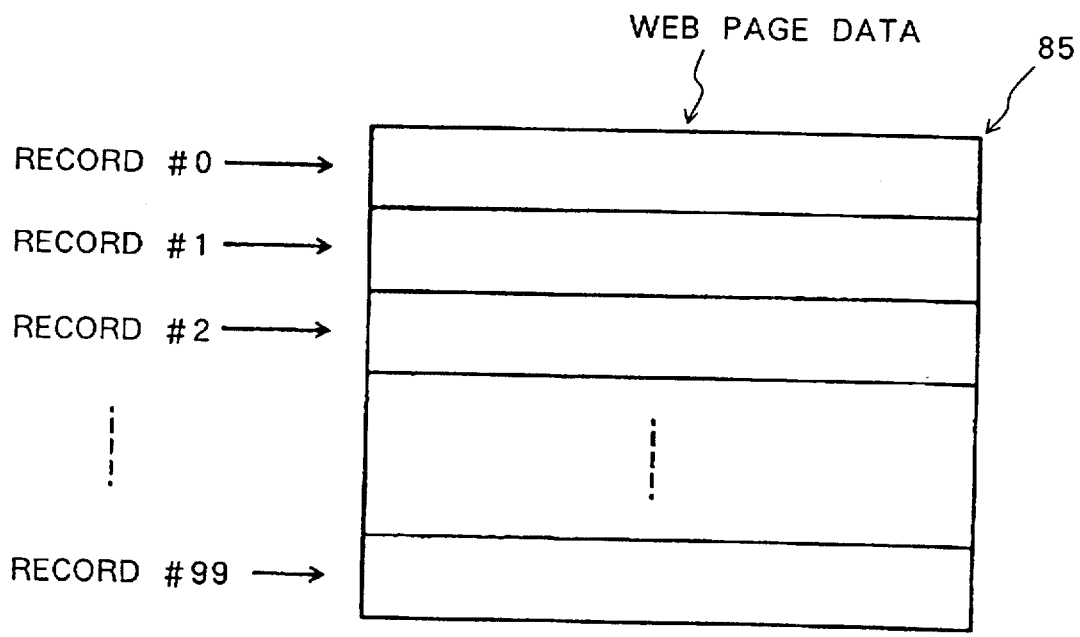
FIG. 34 is a diagram showing the structure of Web page database in the information service terminal according to the fourth embodiment.

As shown in FIG. 34, the Web page database 85 stored in the file device 806 has 100 records each storing data (contents) of a Web page on the Internet.

Operation of the information service terminal according to the fourth embodiment will be described below with reference to a flowchart shown in FIG. 35, which shows a control program stored in the program memory 804 for controlling the information service terminal. In the information service terminal, there are 100 channels ch-0~ch-99 defined each for registering the URL of a Web page on the Internet. The information service terminal calls Web pages having the registered URLs from the Internet at a certain preset time everyday, and stores the data of the called Web pages into the Web page database 85. When the user selects one of the channels with the channel remote-controller 802, the Web page data of the URL registered in the selected channel is read from the Web page database 85 and displayed on the display unit 809.

Specifically, the CPU 803 checks the agreement signal 813 in step 840. If the agreement signal 813 has a value of "1", then the CPU 803 calls a Web page storage process in step 847, after which control returns to step 840.

Figure 36:
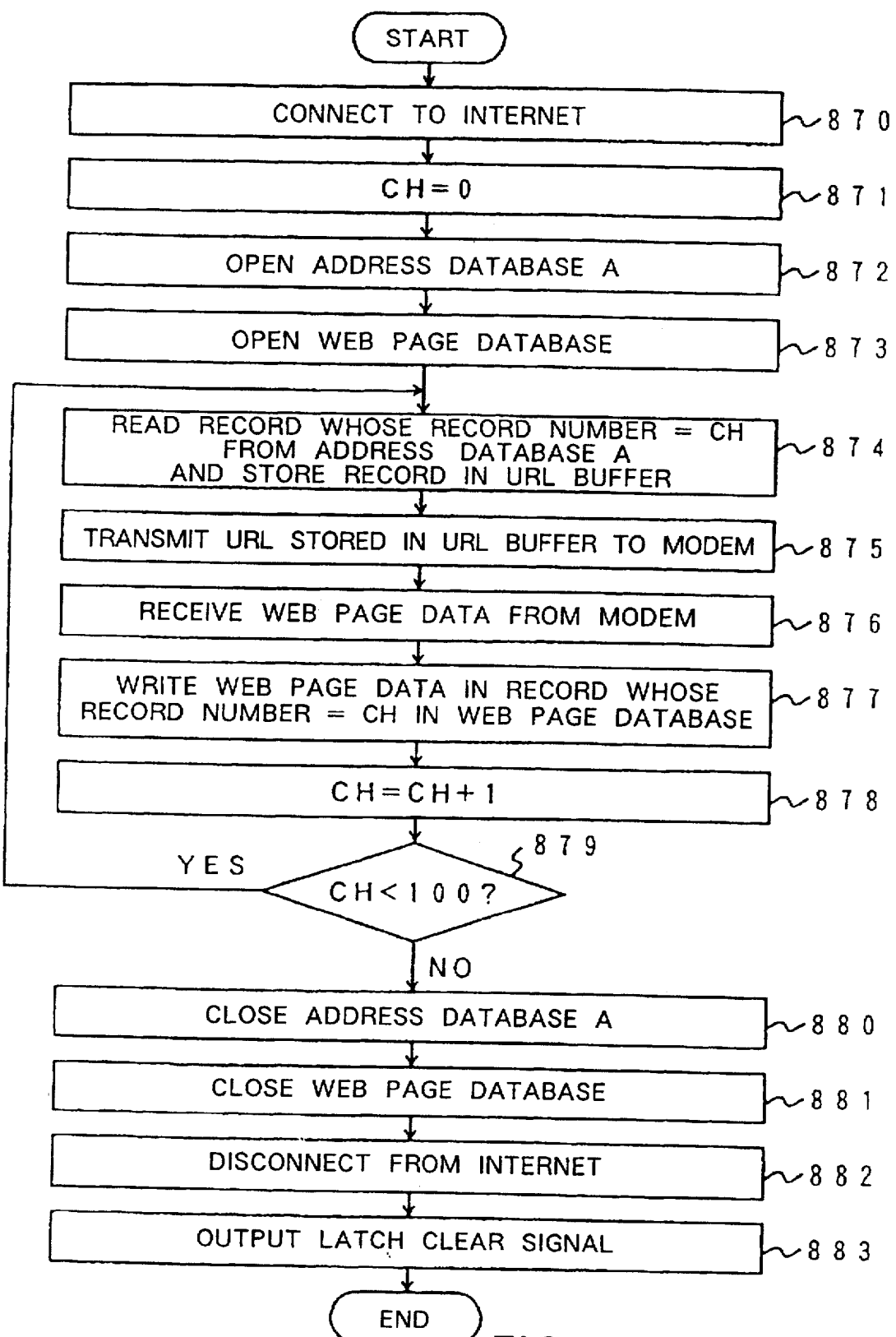
FIG. 36 is a flowchart of an operation sequence of a Web page storage process in the information service terminal according to the fourth embodiment.

The Web page storage process in step 847 will be described below with reference FIG. 36. The CPU 803 connects the information service terminal to the Internet in step 870. The CPU 803 sets the channel variable (CH) to "0" in step 871, opens the address database A in step 872, and opens the Web page database 85 in step 873. Then, the CPU 803 reads a record whose record number is equal to the value of the channel variable (CH) from the address database A, and stores the URL character string in the record into the URL buffer in step 874. In a next step 875, the CPU 803 outputs the URL character string stored in the URL buffer through the modem 810 to the Internet 52. The CPU 803 receives the data of a Web page represented by the URL character string from the Internet 52 through the modem 810 in step 876. The CPU 803 writes the received data of the Web page, i.e., the contents of the Web page, in the Web page database 85 in step 877. At this time, the contents of the Web page are written in the record whose record number is equal to the value of the channel variable (CH).

The CPU 803 adds "1" to the channel variable (CH) in step 878, and determines whether the value of the channel variable (CH) is smaller than "100" (CH<100) or not in step 879. If CH<100, then control goes back to step 874, for repeating steps 874 through 878 with respect to all the 100 records in the address database A. If CH>100 in step 879, i.e., if the repeated execution of steps 874 through 878 is finished, then the CPU 803 closes the address database A in step 8B0, and thereafter closes the Web page database 85 in step 881. The CPU 803 disconnects the information service terminal from the Internet 52 in step 882. Therefore, the data of the Web pages of all the URLs stored in the address database A have been called from the Internet 52 and stored in the corresponding records of the Web page database 85. Finally, the CPU 803 outputs the latch clear signal 814 to the latch 824, clearing the agreement signal 813 in step 883. Therefore, the agreement signal 813 will not be outputted until the preset time held by the comparison time register 822 is reached on the next day. As a result, the Web page storage process is called only once a day. The Web page storage process shown in FIG. 36 is now finished.

Figure 35:
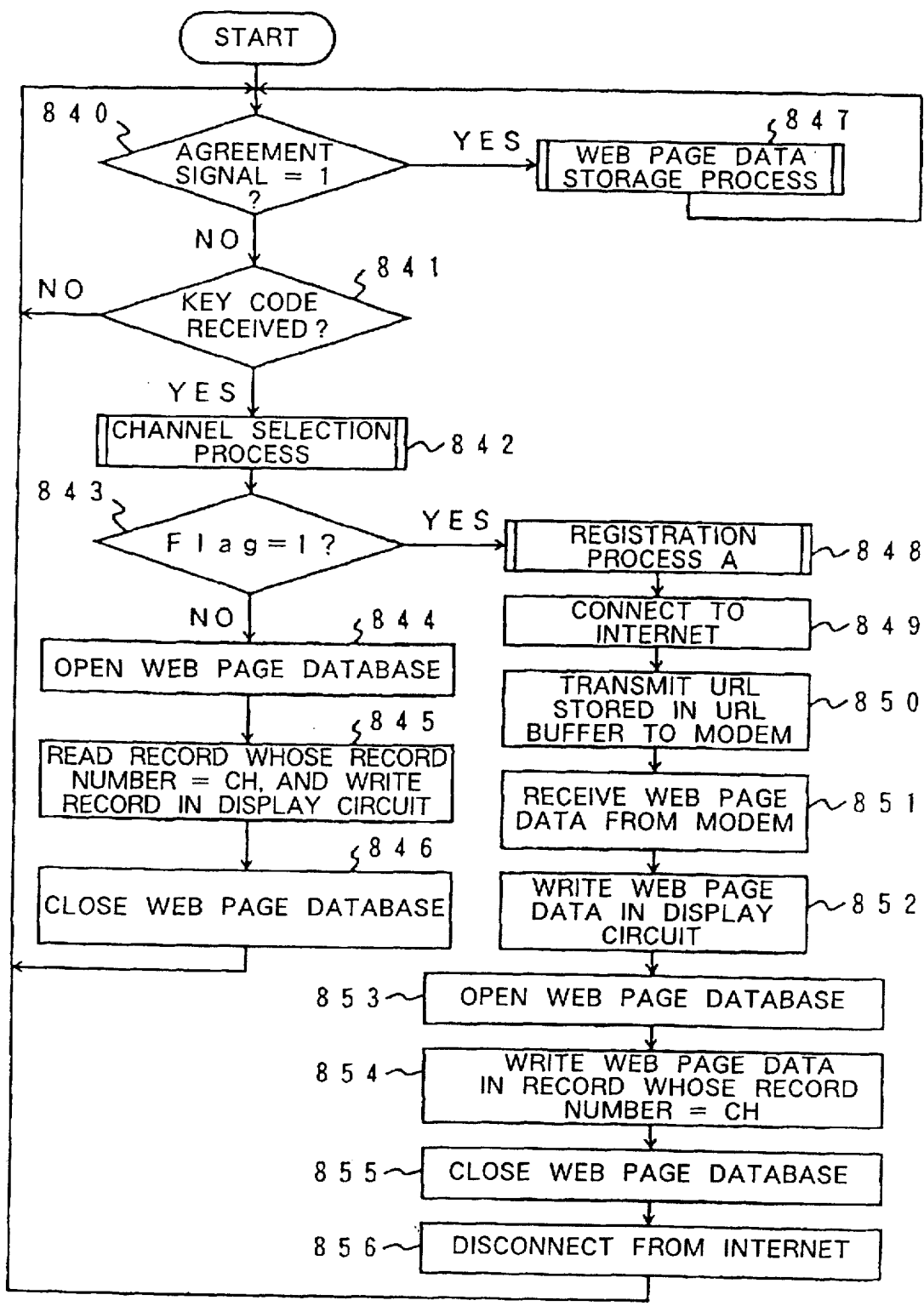
FIG. 35 is a flowchart of an operation sequence of a control program in the information service terminal according to the fourth embodiment.

If the value of the agreement signal 813 is not "1" in step 840 shown in FIG. 35, then the CPU 803 a determines in step 841 whether any key code from the channel remote-controller 802 is received by the infrared radiation receiver 807 or not. If any key code is not received, then control returns to step 840 to wait until the value of the agreement signal 813 becomes "1" or a key code is received. If a key code is received in step 841, then the CPU 803 calls a channel selection process in step 842. The channel selection process in step 842 is identical to the channel selection process according to the first embodiment. The CPU 803 checks the value of the registration flag (Flag) in step 843. If Flag=0, then the CPU 803 opens the Web page database 85 in step 844. In a next step 845, the CPU 803 reads a record whose record number is equal to the value of the channel variable (CH) from the Web page database 85, and writes the Web page data stored in the read record into the display circuit 808 for display on the display unit 809. Then, the CPU 803 closes the Web page database 85 in step 846. Thereafter, control goes back to step 840.

If Flag=1 in step 843, i.e., if the user presses the registration key 41 in the channel selection process, then the CPU 803 calls a registration process A in step 848. The registration process A in step 848 is the same as the registration process A according to the first embodiment, and registers an URL character string inputted from the channel remote-controller 802 by the user, in a record whose record number agrees with the channel variable (CH) in the address database A, i.e., in a presently selected channel. After the registration process A, the CPU 803 connects the information service terminal to the Internet in step 849. In a next step 850, the CPU 803 outputs the URL character string stored in the URL buffer through the modem 810 to the Internet 52. The CPU 803 receives the data of a Web page represented by the URL character string from the Internet 52 through the modem 810 in step 851. The CPU 803 writes the received data of the Web page in the display circuit 808 for display on the display unit 809 in step 852. The CPU 803 opens the Web page database 85 in step 853, writes the received data of the Web page in the record whose record number agrees with the channel variable (CH) in step 854, and then closes the Web page database 85 in step 855. The CPU 803 disconnects the information service terminal from the Internet 52 in step 856. Subsequently, control returns to step 840.

Since the information service terminal according to the fourth embodiment reads and stores information from the information service in advance, it can display the stored information very quickly at a time selected by the user.

Furthermore, the information service terminal according to the fourth embodiment can save telephone charges because it can access the information service in economy hours, such as a night discount rate hour, where telephone charges are lower than other hours.

While preferred embodiments of the present invention have been described using specific terms, such description is for illustrative purposes only, and it is to be understood that changes and variations may be made without departing from the spirit or scope of the following claims.

What is claimed is:

1. An information service terminal, comprising:

address database means for storing addresses or paths assigned to respective items of information available from an information service, in association with respective channels;

input means for inputting a channel number;

selecting means for selecting one of said channels, depending on the channel number, to search said address database means for a corresponding one of the addresses or paths stored therein to acquire a corresponding item of information from said information service, said selecting means directly accessing said corresponding one of the addresses or paths to acquire said corresponding item of information; and display means for displaying the acquired item of information.

2. The information service terminal according to claim 1, wherein said information service comprises information sites on the Internet, said addresses comprising uniform resource locators.

3. The information service terminal according to claim 1, wherein said information service comprises a personal computer communication service, said paths comprising a list of commands for calling contents from said personal computer communication service with a hierarchical menu.

4. The information service terminal according to claim 1, wherein said input means comprises a first button for incrementing the channel numbers and a second button for decrementing the channel numbers, whereby one of said channels can be selected by operating only said first button and said second button.

5. The information service terminal according to claim 4, wherein said display means and said input means are separate from each other, and said input means is used for remote-controlling to display a desired item of information.

6. The information service terminal according to claim 1, wherein said address database means comprises means for storing connection information for connecting to a plurality of information services, and one of said information services is selected depending on the inputted channel number to connect thereto, thereby said information service terminal acquiring information from the selected one of the information services, and displaying the acquired information on said display means.

7. The information service terminal according to claim 6, wherein said information services include the Internet and at least one personal computer communication service, uniform resource locators are used as said addresses with respect to said Internet, and lists of commands for calling contents from said personal computer communication service with a hierarchical menu are used as said paths with respect to said personal computer communication service.

8. The information service terminal according to claim 1, further comprising television broadcast receiving means for receiving television broadcasts, said channels including a first group of channels assigned respectively to television channels of the television broadcasts and a second group of channels assigned respectively to said addresses or paths, wherein a picture in one of said television channels is displayed on said display means when a corresponding one of said channels of said first group is selected;

an item of information corresponding one of said addresses or paths is specified by the selected one of the channels is acquired from said information service and the acquired item of information is displayed on said display means when a corresponding one of said channels of said second group is selected.

9. The information service terminal according to claim 8, wherein information service comprises information sites on the Internet, said addresses comprising uniform resource locators.

10. The information service terminal according to claim 8, wherein said information service comprises a personal computer communication service, said paths comprising a list of commands for calling contents from said personal computer communication service with a hierarchical menu.

11. The information service terminal according to claim 8, wherein said input means comprises a first button for incrementing the channel numbers and a second button for decrementing the channel numbers, whereby one of said channels can be selected by operating only said first button and said second button thereby to switch between the display of a television broadcast and the display of an item of information from said information service.

12. The information service terminal according to claim 11, wherein said display means and said input means are separate from each other, and said input means is used for remote-controlling to display either the picture in the television channel or the acquired item of information.

13. The information service terminal according to claim 1, wherein the addresses or paths are stored in said address database means before power up of said information service terminal.

14. An information service terminal comprising:

address database means for storing addresses or paths assigned to respective items of information available from an information service, in association with respective channels;

input means for inputting a channel number;

selecting means for selecting one of said channels depending on the channel number;

display means for displaying an acquired item of information;

timer means for detecting whether a predetermined time interval is reached or not;

storage means for storing contents of the respective items of information; and control means for connecting to said information service, acquiring the items of information based on the addresses or passes stored in said address database means from said information service, and storing the acquired items of information into said storage means when said predetermined time is reached everyday as detected by said timer means, and for reading one of the items of information from said storage means and displaying the read item of information when a corresponding one of the channel numbers is selected by said selecting means.

15. The information service terminal according to claim 14, wherein said information service comprises information sites on the Internet, said addresses comprising uniform resource locators.

16. The information service terminal according to claim 14, wherein said input means comprises a first button for incrementing the channel numbers and a second button for decrementing the channel numbers, whereby one of said channels can be selected by operating only said first button and said second button.

17. The information service terminal according to claim 16, wherein said display means and said input means are separate from each other, and said input means is used for remote-controlling to display the acquired item of information.

18. The information service terminal according to claim 14, wherein said timer means detects whether a predetermined time is reached or not everyday.

* * * * *